(12) United States Patent
Wilson et al.

(10) Patent No.: US 7,511,703 B2
(45) Date of Patent: Mar. 31, 2009

(54) USING SIZE AND SHAPE OF A PHYSICAL OBJECT TO MANIPULATE OUTPUT IN AN INTERACTIVE DISPLAY APPLICATION

(75) Inventors: Andrew D. Wilson, Seattle, WA (US); Joel P. Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 10/879,872

(22) Filed: Jun. 28, 2004

(65) Prior Publication Data

US 2006/0007123 A1   Jan. 12, 2006

(51) Int. Cl.
*G09G 5/00* (2006.01)
(52) U.S. Cl. .................................. 345/175; 178/18.09
(58) Field of Classification Search ................. 345/173, 345/179, 175; 178/18.09
See application file for complete search history.

(56) References Cited

U.S. PATENT DOCUMENTS

| | | | | | |
|---|---|---|---|---|---|
| 4,561,017 | A | * | 12/1985 | Greene | 348/707 |
| 4,992,650 | A | | 2/1991 | Somerville | 235/462 |
| 5,155,813 | A | * | 10/1992 | Donoghue et al. | 345/179 |
| 5,347,620 | A | * | 9/1994 | Zimmer | 345/592 |
| 5,481,710 | A | * | 1/1996 | Keane et al. | 719/320 |
| 5,488,204 | A | * | 1/1996 | Mead et al. | 178/18.06 |
| 5,638,093 | A | * | 6/1997 | Takahashi et al. | 345/173 |
| 5,646,650 | A | * | 7/1997 | Miller et al. | 345/179 |
| 5,841,078 | A | * | 11/1998 | Miller et al. | 178/18.06 |
| 5,914,708 | A | * | 6/1999 | LaGrange et al. | 345/179 |
| 6,201,528 | B1 | * | 3/2001 | Lucas et al. | 345/611 |
| 6,329,995 | B1 | * | 12/2001 | Nagashima | 345/506 |
| 6,598,978 | B2 | * | 7/2003 | Hasegawa | 353/42 |
| 6,603,463 | B1 | * | 8/2003 | Rising, III | 345/179 |
| 6,606,086 | B1 | * | 8/2003 | Sumner | 345/173 |
| 7,126,609 | B1 | * | 10/2006 | Asente et al. | 345/581 |
| 2003/0043189 | A1 | * | 3/2003 | Rieffel et al. | 345/753 |
| 2006/0097991 | A1 | * | 5/2006 | Hotelling et al. | 345/173 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

(Continued)

*Primary Examiner*—Richard Hjerpe
*Assistant Examiner*—Tom V Sheng
(74) *Attorney, Agent, or Firm*—Workman Nydegger

(57) ABSTRACT

Output of a computer system is manipulated using a physical object disposed adjacent to an interactive display surface. A painting application produces an image in response to an object disposed adjacent to the interactive display surface. During each of a plurality of capture intervals, a set of points corresponding to the object is detected when the object is disposed adjacent to the interactive display surface. An image is projected onto the interactive display surface representing the set of points and is filled with a color or pattern. As successive sets of points are accumulated during each of a plurality of capture intervals, a composite image is displayed. An object can thus be used, for example, to "draw," "paint," or "stamp" images on the display surface. These images manifest characteristics of the object and its interaction and movement relative to the interactive display surface in a realistic manner.

64 Claims, 15 Drawing Sheets

OTHER PUBLICATIONS

"Bar Code 1, 2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80, 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing, "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3.&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bemier, Forlines, and Frost. "Sharing and Building Digital Group Histories." *CSCW'02*, Nov. 16-20, 2002, New Orleans, Louisiana. © 2002 ACM 1-58113-560-2/02/0011. 10 pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Stamer, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geiβler, Holmer, Konomi, Müller-Tomfelde, Reischl, Rexrogh, Seitz, and Steinmetz. "i-Land: An interactive Landscape for Creativity and Innovation." *Proceedings of the ACM Conference on Human Factors in Computing Systems (CHI'99)*, Pittsburgh, Pennsylvania, May 15-20, 1999, ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDesk: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

\* cited by examiner

USING SIZE AND SHAPE OF A PHYSICAL OBJECT TO MANIPULATE OUTPUT IN AN INTERACTIVE DISPLAY APPLICATION

FIELD OF THE INVENTION

The present invention generally pertains to a computing system having an interactive display surface operable to detect a shape presented by an object placed on or adjacent to the interactive display surface, and, more specifically, pertains to generating one or more images on the interactive display surface related to the shape presented by the object relative to the interactive display surface.

BACKGROUND OF THE INVENTION

Since the inception of graphical user interfaces, computer painting and drawing software applications have been popular. By manipulating a mouse or another pointing device, a user can create images on the screen, which are easily edited. Typical paint programs enable a user to select pencils, brushes, spray paint cans, or other virtual tools for creating drawings. By clicking a mouse button and then dragging a pointer across the screen by moving the mouse, the user can paint or draw shapes on the screen. Of course, because the image is created on a virtual canvas supported by the computer, the user enjoys the advantages of being able to easily print and save the "painting," undo mistakes with a keystroke, make changes in colors and fill patterns already "painted," or simply scrap the drawing on the virtual canvas in favor of a new one, to name just a few examples.

While painting programs derive some of their popularity from these advantages of using a computer, undoubtedly some of the fascination with paint programs is the computer's response to the user movements. With a push of a finger and a move of the wrist, a user can "paint" a streak across the display that varies depending upon how the user moved a hand and/or arm in making the paint stroke. The response of the computer in such an application, therefore, presents an appealing and welcoming human-machine interface in which a user can interact with the computer in a very tangible manner.

On the other hand, while painting and drawing programs are popular, the lastingness of their appeal is somewhat limited. Although the movement of the mouse provides an appealing interaction with the computer, it is not a natural way to paint or draw. Although computers have become very commonplace in homes and schools, most people still learn to write, draw, and paint with crayons, pencils, pens, markers, brushes, and even one's fingers. The interaction of clicking a mouse button and moving a mouse across a desktop does not fully satisfy or replace the feeling one gets with using conventional implements for drawing and painting.

Moreover, not only is the human interaction with a mouse or other pointing device not the same as using a more traditional painting or drawing implement, but, with typical computer painting programs, the user never really engages the virtual paper or canvas. When a person creates a drawing or painting on real media, that person puts pen to paper, or brush to canvas. By contrast, using a typical paint program, a user moves a mouse across a horizontal desktop and watches the resulting images appear on a vertically-disposed computer screen. In other words, as is the case with most computer programs, the user engages the computer at one location, while the resulting output appears at a second location and in a different orientation.

In efforts to improve the user-friendliness of computers, some developers have created systems where users can interact more directly with a display surface. For example, the MIT Media Lab, as reported by Brygg Ullmer and Hiroshi Ishii in "The metaDESK: Models and Prototypes for Tangible User Interfaces," *Proceedings of UIST* 10/1997:14-17," has developed another form of "keyboardless" human-machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface.

Others have been developing similar keyboardless interfaces. For example, papers published by Jun Rekimoto, of the Sony Computer Science Laboratory, Inc., and associates describe a "HoloWall" and a "HoloTable" that display images on a surface and use IR light to detect objects positioned adjacent to the surface.

By detecting a specially formed object or IR-reflected light from an object disposed on a graphical display surface, the metaDESK can respond to the contemporaneous placement and movement of the object on the display surface to carryout a predefined function, such as displaying and moving a map of the MIT campus. Ultimately, however, it would be desirable to expand upon this functionality, to enable a system that would respond appropriately to ordinary objects disposed adjacent to the display surface to make the use of a personal computer even more natural. In particular, to create a more satisfying painting or drawing environment, it is desirable to create an environment where a user is able to directly engage a virtual canvas. Furthermore, to provide a user full creative expression, it is desirable to enable a user to interact with the virtual canvas using actual art tools such as a brush or tools with the shape and feel of actual art tools. In addition, it is desirable for the system to respond to the tools and generate images appearing similar to those that might result from using an actual pen, pencil, brush, or other tool on real paper or canvas.

SUMMARY OF THE INVENTION

One of the advantages of the present invention is that it provides a realistic environment on a computer system having an interactive display surface for a user to draw or paint images. Unlike conventional drawing or painting programs, the user does not create images by manipulating a pointing device such as a mouse or a similar device at a position removed from the display surface. Instead, comparable to drawing on real paper or painting on a real canvas, the user creates images by moving a physical object directly over the interactive display surface. Furthermore, the interactive display surface responds to the size and shape of the physical object being used to create the images, as detected by the interactive display surface, and the images that are produced correspond to the shape that is detected. Thus, again in manner comparable with "real" drawing or painting, if a user employs a paint brush to "paint" on the screen, the images generated respond to the size and shape of the brush and to the varying spread of the bristles as the user presses the brush on the screen with more or less force. Similarly, if the user wishes to paint with the fingers of a hand, the images generated represent the individual fingers of the user's hand as the user's hand moves across the interactive display surface. In addition, in a preferred embodiment in which the interactive display surface detects objects based on reflected IR light, a user can create images by placing stamps, rollers, or objects on the interactive display surface. Accordingly, the present invention can provide a realistic drawing or painting environment that provides a user with great flexibility in responding to the tools that the user chooses to employ in creating images.

In regard to another aspect of the present invention, the output of a computer system is manipulated using a physical object disposed adjacent to an interactive display surface. An application that is configured to generate an output on the interactive display surface responsive to a physical object disposed adjacent to the interactive display surface is executed on the computer system. During each of a plurality of capture intervals, a set of points presented by the physical object is detected when the physical object is disposed adjacent to the interactive display surface. (As used herein in regard to an object being adjacent to the interactive display surface, the term "adjacent to" is intended to encompass the condition in which an object is actually in contact with the interactive display surface, as well as the condition in which the object is proximate to the interactive display surface, but not in actual contact therewith.) An image is generated on the interactive display surface representative of the set of points detected, and the image is filled with a pattern. Images of sets of points presented by the physical object are accumulated during each of the plurality of capture intervals, and a composite image of the accumulated images is presented on the interactive display surface. The physical object can thus be used, for example, to draw or paint images on the screen, resulting in an image manifesting characteristics of the physical object and how it is disposed against and moved relative to the interactive display surface.

In accordance with one embodiment of the present invention, the set of points presented by the physical object may be determined by transmitting IR light through the interactive display surface toward a face of the interactive display surface adjacent to which the physical object is disposed and sensing IR light reflected from the physical object back through the interactive display surface. At least one connected component presented by the physical object is recognized as including a plurality of adjoining points meeting a predefined condition. A connected component may be bounded by outermost points not having adjoining points in all considered directions.

Responding to the connected component, an image is generated that represents the set of points with at least one ellipse. Each such ellipse corresponds to a connected component. The ellipse has a major axis and a minor axis, and these dimensions are sufficient to encompass an outermost point of all points included in the connected component. Alternatively, the ellipse is determined as an ellipse having an equivalent statistical center and spatial moments, as the points included in the connected component. Once the ellipses representing the sets of points are generated, the ends of major axes and ends of minor axes of the ellipses may be connected with continuing lines, and the spaces bounded by the continuing lines filled in with a pattern.

Instead of representing each set of points with an ellipse, actual sets of points determined can be used to represent the images. The resulting composite image can be filled in or otherwise enhanced by compositing or blending each of the accumulated images at an offset to the accumulated images.

In accordance with another aspect of the present invention, the pattern used for filling an ellipse (or shape) may be elicited from a user. Available pattern attributes may be presented in a designated portion of the interactive display surface where the user can select the pattern by placing the physical object or another physical object adjacent to the designated portion of the interactive display surface. The designated portion of the display screen may include a plurality of regions representing a palette of available patterns. For example, the pattern may comprise either a solid color or a configuration of lines.

In one embodiment of the present invention, the accumulated images may be successively faded as a function of an interval passing since the capture interval during which the set of points from which the image was generated was detected. Thus, images generated more recently in response to more recent "strokes" applied by the user will be presented more boldly than those generated in response to older "strokes" that fade over time. Similarly, accumulated images that overlap with each other and thus occupy the same location on the interactive display surface may be altered to reflect the overlap.

A user may be given the option to undo creation of a previously created image, or redo an image that previously was undone. A user also may be enabled to pause creation of the image, to prevent the passage of time from changing images currently presented on the interactive display surface.

Also in accordance with another aspect of the present invention, a memory medium is provided on which are stored machine instructions for carrying out the steps of generating output on the interactive display surface responsive to a physical object disposed adjacent to the interactive display surface, generally as described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
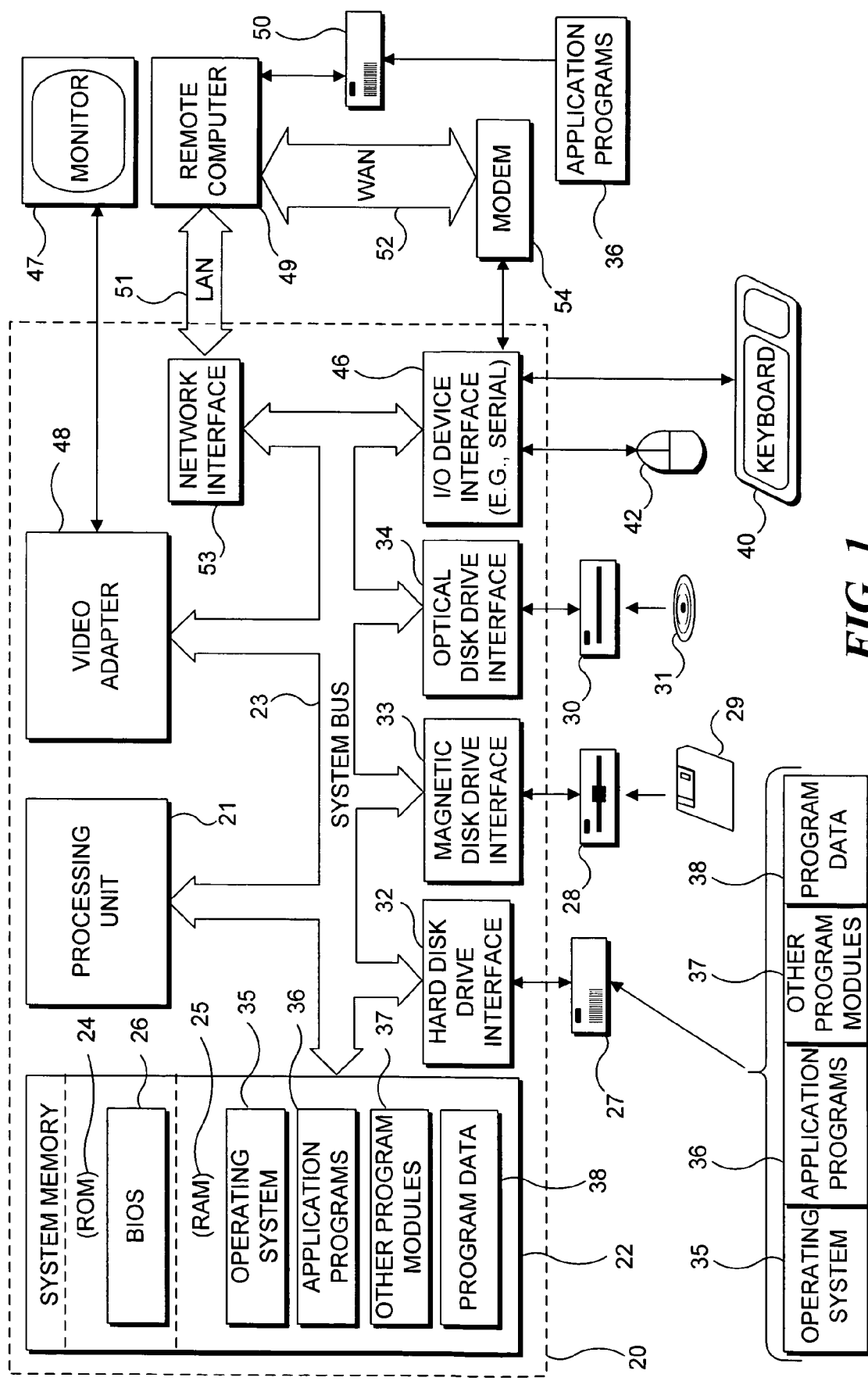
FIG. 1 is a functional block diagram of a generally conventional computing device or personal computer (PC) that is suitable for use with an interactive display surface, in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
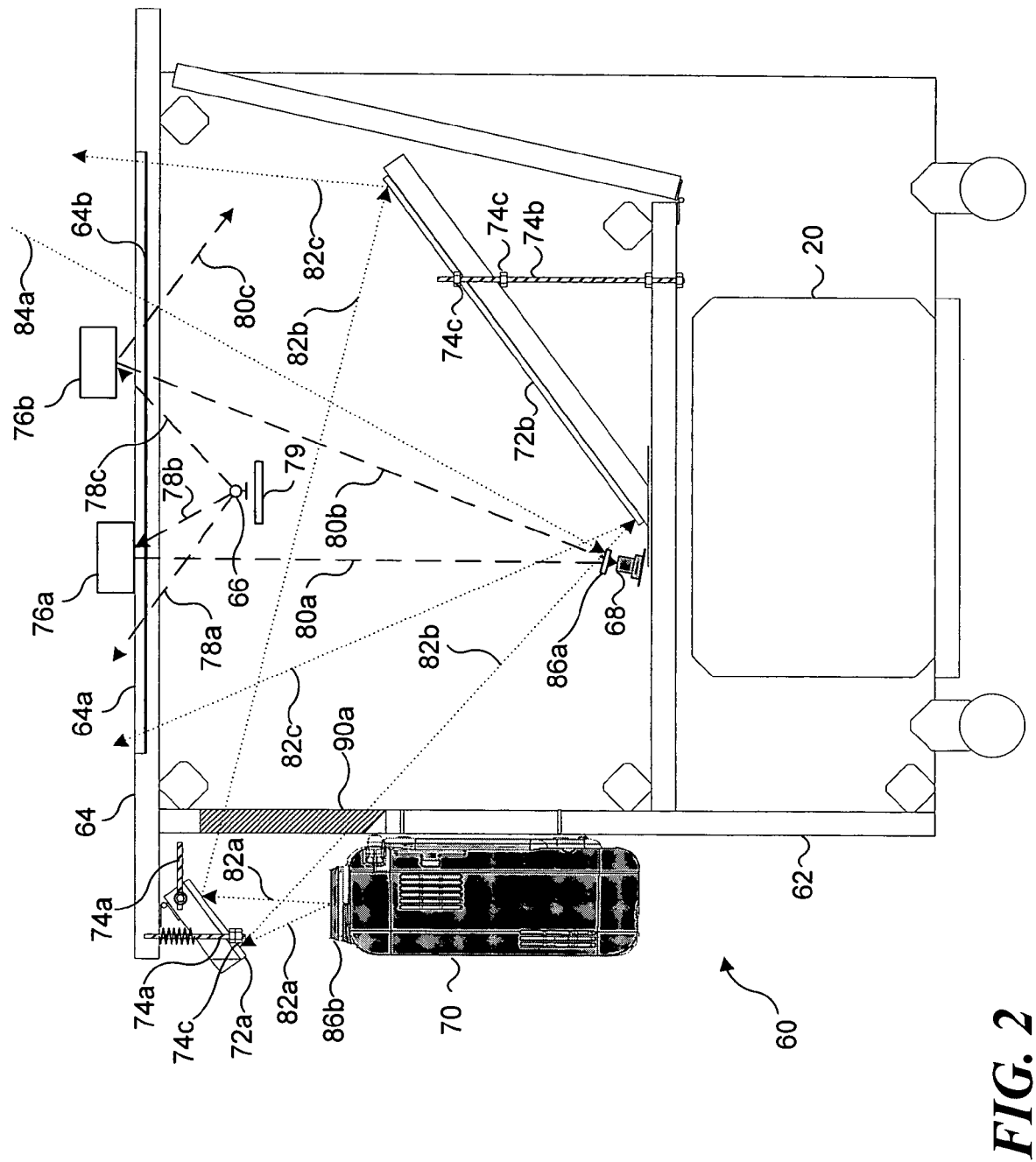
FIG. 2 is a cross-sectional view illustrating internal components of an interactive display surface in the form of an interactive table that includes an integral PC.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
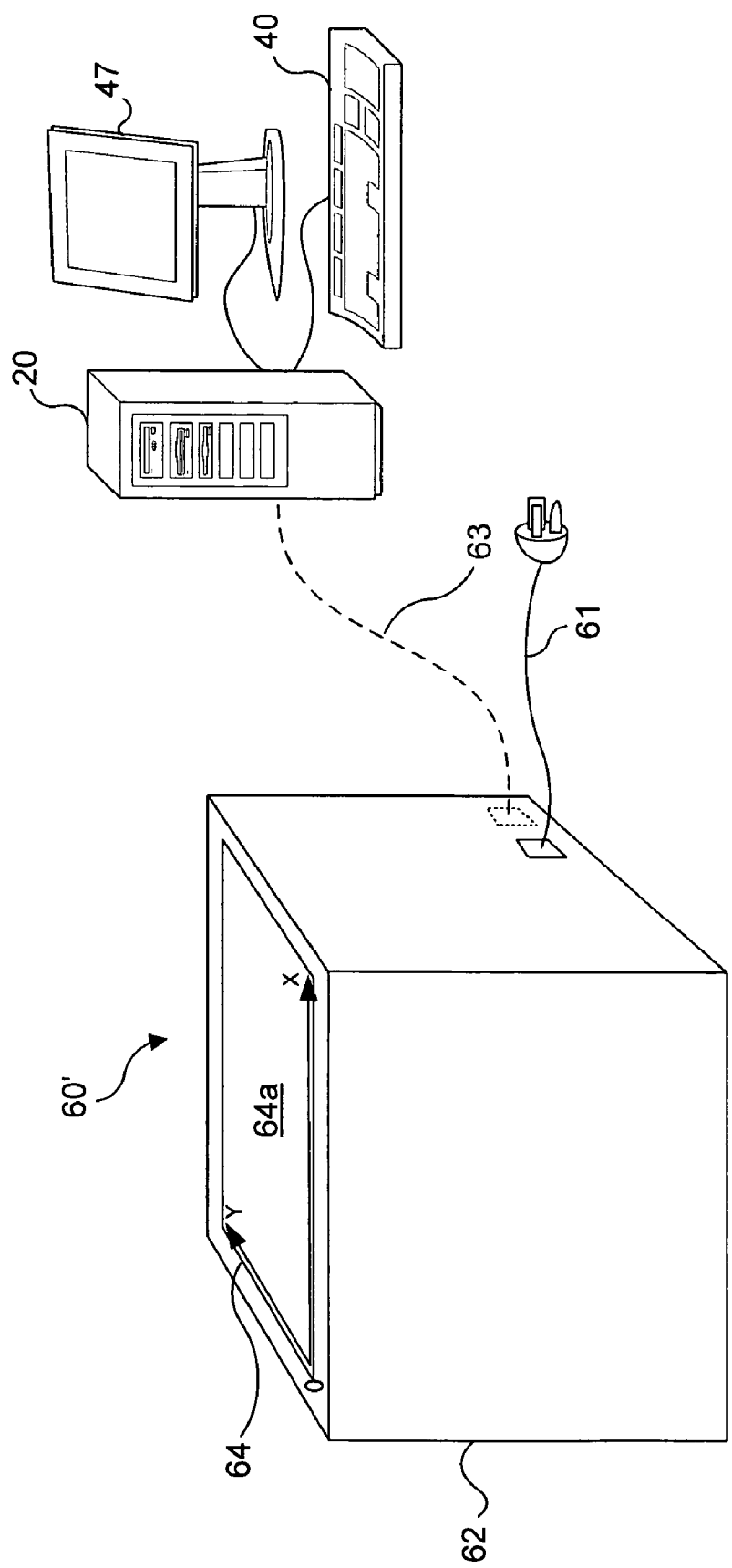
FIG. 3 is an isometric view of an embodiment in which the interactive table is connected to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as an object 76a, or are hovering just above it, such as an object 76b. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Using a Physical Object to "Paint" on the Interactive Display Surface

Figure 4A:
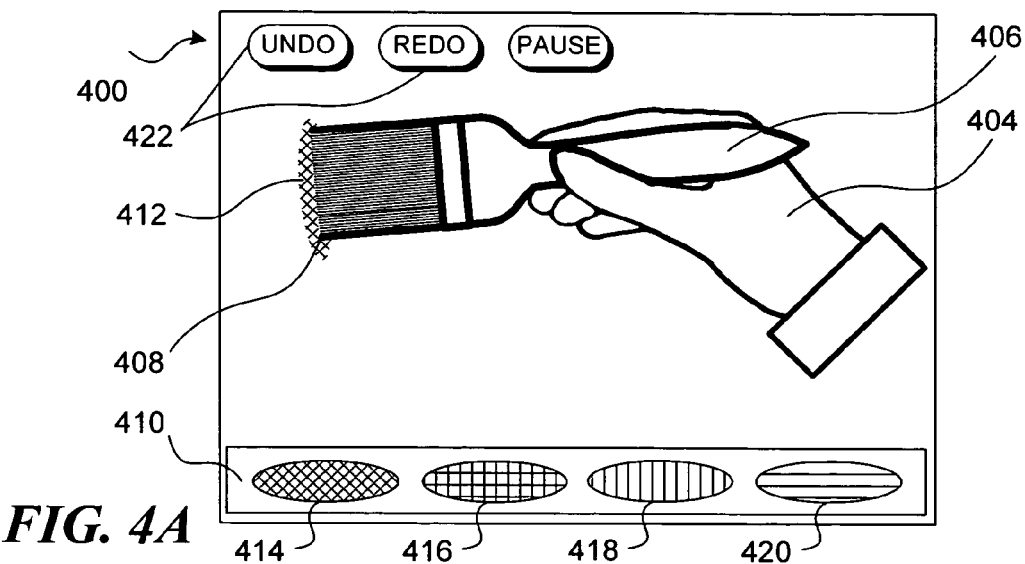
FIGS. 4A-4C illustrate a user employing an ordinary physical object to "paint" on the interactive display surface.
Figure 4B:
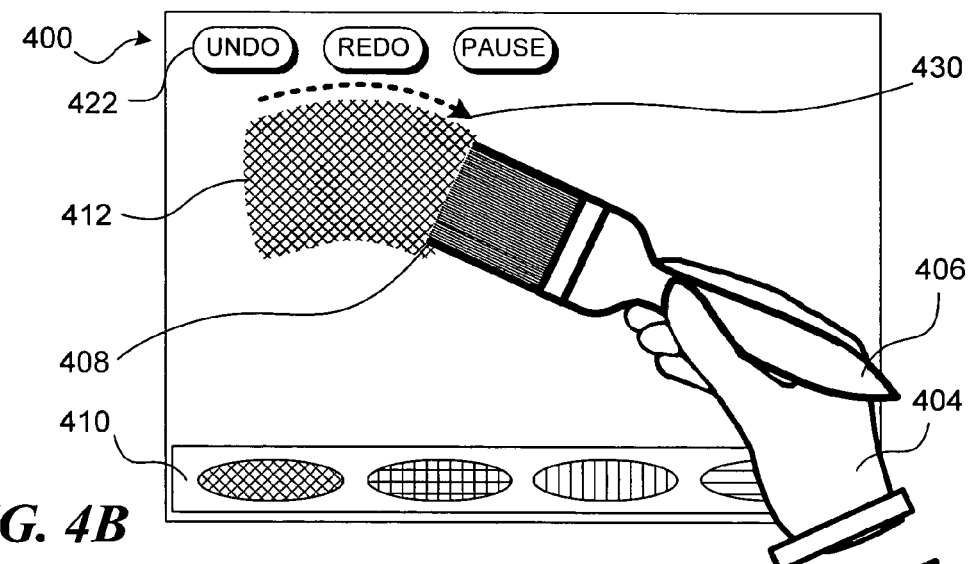
Figure 4C:
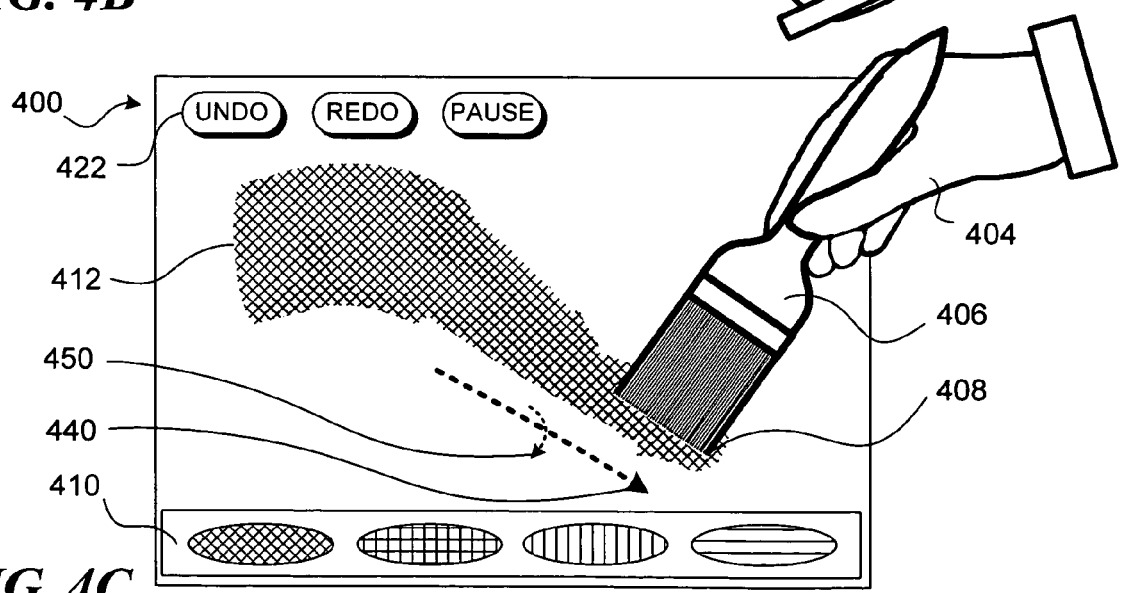

In FIGS. 4A-4C, a user employs an ordinary physical object to "paint" on interactive display surface 400. More particularly, FIGS. 4A-4C represent a series of frames showing a user "painting" a stroke across interactive display 400 using an ordinary dry paint brush 406 (having white bristles that reflect IR light).

In FIG. 4A, a tip 408 of brush 406 has just been touched to interactive display surface 400, resulting in a blot of virtual paint appearing on interactive display surface 400 where touched by tip 408. A color for the virtual paint was selected by touching tip 408 of brush 406 to a palette 410 displayed on interactive display surface 400. Palette 410 includes a plurality of virtual paint colors 414-420 from which to choose. The user chose virtual paint color 414, and thus, the stroke is displayed using virtual paint color 414 from palette 410.

In addition to palette 410, interactive display surface 400 also presents a number of virtual buttons 422 enabling a user to undo, redo, or pause the painting process. As is familiar to users of many contemporary computer applications, an "UNDO" button enables a user to reverse the changes made in a preceding action. A "REDO" button enables a user to redo a step that previously was just undone. Again, the function of the "REDO" button will be familiar to users of contemporary computer applications. The virtual buttons also include a "PAUSE" button. As will be further explained below in connection with FIG. 8C, a user optionally can set virtual display surface 400 to cause the virtual paint to fade over time to create a changing, dynamic illustration. The "PAUSE" button enables a user to toggle between pausing and unpausing time-dependent functions, such as the fade feature. Virtual buttons 422 are engaged by touching one of buttons 422 with a physical object (such as the user's finger tip).

In FIG. 4B, user's hand 404 has dragged paint brush 406 across interactive display surface in an arc represented by an arrow 430. As can be seen from FIG. 4B, the path of the virtual paint stroke generally follows the shape of arrow 430 and is approximately as wide as tip 408 of brush 406. Accordingly, painting on interactive display surface 400 with paint brush 406 is very much like painting with a real brush on paper or canvas.

Furthermore, in FIG. 4C, user's hand 404 has dragged paint brush 406 across interactive display surface along a straight line represented by an arrow 440. While dragging paint brush 406 in the direction of arrow 440, user's hand 404 also has rotated brush 406 by about 90°, as represented by an arrow 450. As a result of brush 406 being turned in the direction of arrow 440 while making the stroke, tip 408 of brush 406 now presents a narrower painting surface to interactive display surface 400, causing the width of the virtual paint stroke to also narrow. Again, interactive display surface 400 responds to the movement and position of brush 406 by displaying a virtual paint stroke similar to what might appear on canvas or paper using a real brush with real paint.

As described above, interactive display surface 400 responds by using IR video camera 68 to detect and respond to IR light from IR source 66 that is reflected from any object adjacent to the interactive display surface. Accordingly, it will be appreciated that any number of physical objects may be used to draw or paint on interactive display surface 400, as long as the physical object selected reflects IR light generated by IR source 66. In addition, as a practical matter, physical objects chosen for painting should neither scratch nor otherwise damage interactive display surface 400. Similarly, physical objects chosen should not apply any material to interactive display surface 400 that would render the interactive display surface 400 opaque to IR light generated by IR source 600. Damaging or rendering interactive display surface 400 opaque would interfere with the ability of the interactive display surface to detect physical objects disposed adjacent thereto.

Response of the Interactive Display Surface to Objects

Figure 5A:
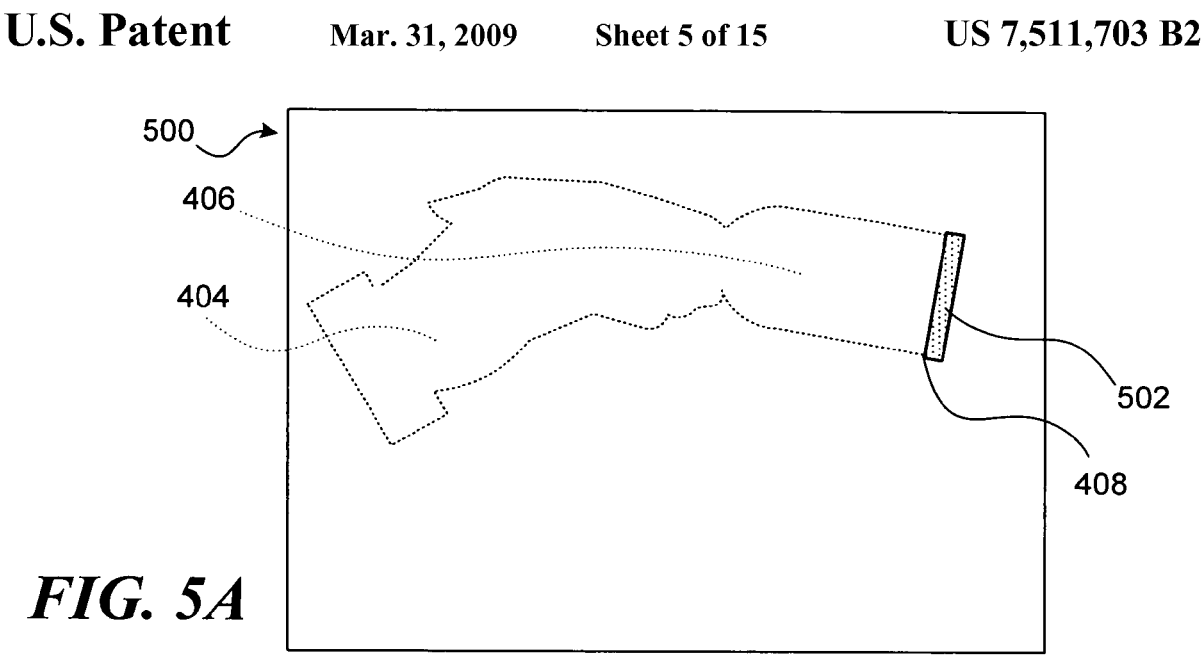
FIGS. 5A-5C illustrate a reverse view of the interactive display surface illustrating how the interactive display surface detects sets of points presented by the physical object during a series of capture intervals.
Figure 5B:
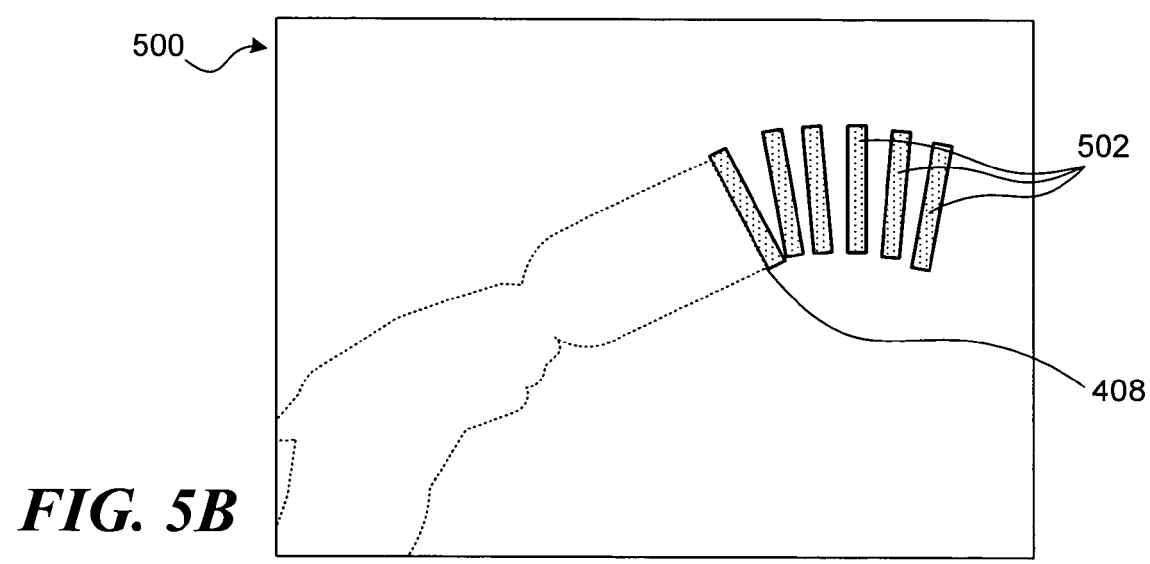
Figure 5C:
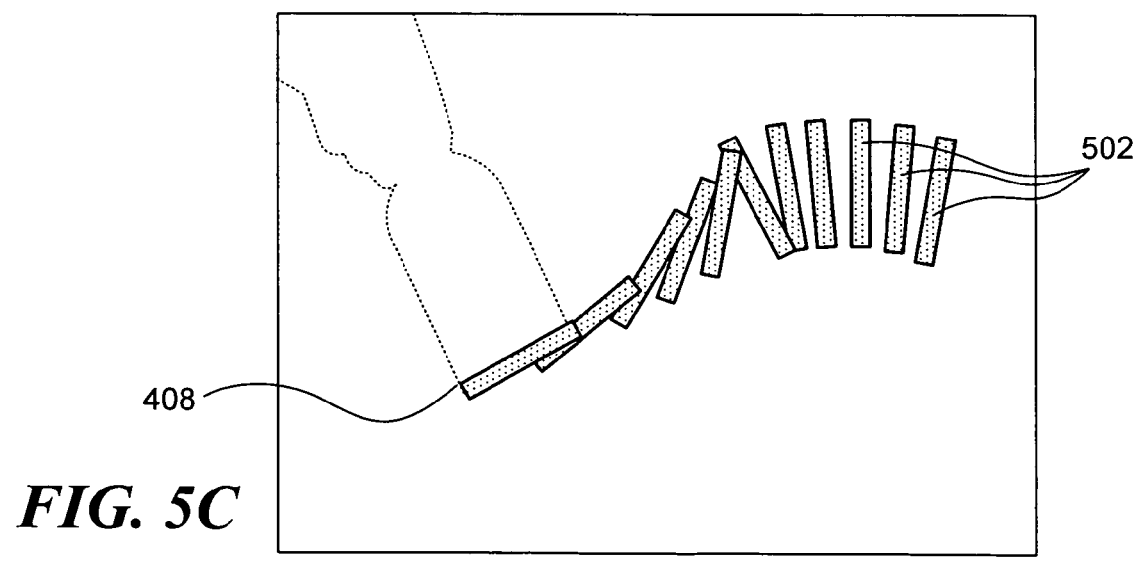

FIGS. 5A-5C illustrate an underside 500 of interactive display surface 400, illustrating how the interactive display surface detects and tracks an object, such as paint brush 406, which is employed to "apply" virtual paint (as shown in FIGS.

4A-4C). In FIGS. 5A-5C, user's hand 404 and brush 406 are represented in phantom form by a dotted outline for perspective, although in this example, interactive display surface 400 does not respond to user's hand 404 and to any portion other than the tip of paint brush 406 touching the interactive display surface. Interactive display surface 400 may respond to objects both touching and hovering over the interactive display surface, as described in the commonly-assigned patent application, application Ser. No. 10/814,761 entitled "Determining Connectedness And Offset Of 3D Objects Relative To An Interactive Surface," filed on Mar. 31, 2004. However, in this particular interactive application, to create an environment having the characteristics of drawing and painting on paper or a canvas, it is desirable to respond only to objects touching interactive display surface 400 or very nearly touching the interactive display surface. Accordingly, interactive display surface 400 is set to respond only to physical objects reflecting IR light beyond a predetermined threshold indicative of a physical object actually (or nearly) touching interactive display surface 400. Therefore, interactive display surface 400 generally responds only to tip 408 of the paint brush.

In one embodiment of the present invention, interactive display surface 400 detects a set of points 502 presented by the physical object disposed adjacent to the interactive display surface during each of a plurality of capture intervals. The capture intervals, in one embodiment of the invention, correspond with the frames captured by IR video camera 68 (FIG. 2). Images are generated on interactive display surface 400 in accordance with sets of points detected on underside 500 of the interactive display surface. More specifically, FIG. 5A corresponds with FIG. 4A, with FIG. 4A showing virtual paint generated in response to set of points 502 presented by tip 408 of paint brush 406 touching interactive display surface 400.

As shown in FIGS. 5B and 5C, sets of points 502 detected and captured by IR video camera 68 over time correspond to where the tip 408 of paint brush 406 touched interactive display surface 400 over time as each frame is captured. Sets of points 502 captured are maintained with images generated in response to sets of points 502, resulting in the virtual paint stroke shown in FIGS. 4A-4C, which is described below in further detail.

It should be noted that sets of points 502 all are uniformly rectangular. However, the characterization of sets of points 502 as rectangular merely represents an illustrative view of the sets of points for a physical object that is used to paint on interactive display surface 400. A round brush could be used that might result in sets of points that are round. Alternatively, if paint brush 406 with its rectangular tip 408 is pressed firmly against interactive display surface 400, tip 408 would no longer present a rectangular object or result in a rectangular set of points 502. The resulting shape presented and resulting set of points would likely be geometrically irregular in shape, and that irregular shape may vary over time as the pressure applied to paint brush 406 by user's hand 404 changes. Further, the pressure applied through paint brush 406 may cause the bristles of paint brush 406 to spread apart and fan outwardly at tip 408, resulting in two or more multiple objects being perceived by interactive display surface. In addition, changing the pressure applied to paint brush 406 or another deformable physical object can cause set of points 502 to change during the course of a stroke used to paint on the interactive display surface, and the set of points may change with each capture interval or frame. The present invention preferably will capture sets of points 502 corresponding to shapes detected at interactive display surface regardless of the nature of the shape, how many shapes there are, or whether one or more shapes are changing over time.

It also should be noted that IR video camera 68 preferably captures IR image data at a rate of 30 frames per second (or more). Accordingly, unless user's hand 404 drags paint brush 406 very rapidly across interactive display surface 400 or a IR video camera 68 with a slower effective rate of frame capture is employed, sets of points 502 captured may not be as separated or distinct as shown in FIGS. 5B and 5C. Delineation of sets of points 502 is exaggerated in these Figures to more clearly illustration the operation of one embodiment of the present invention.

Figure 5D:
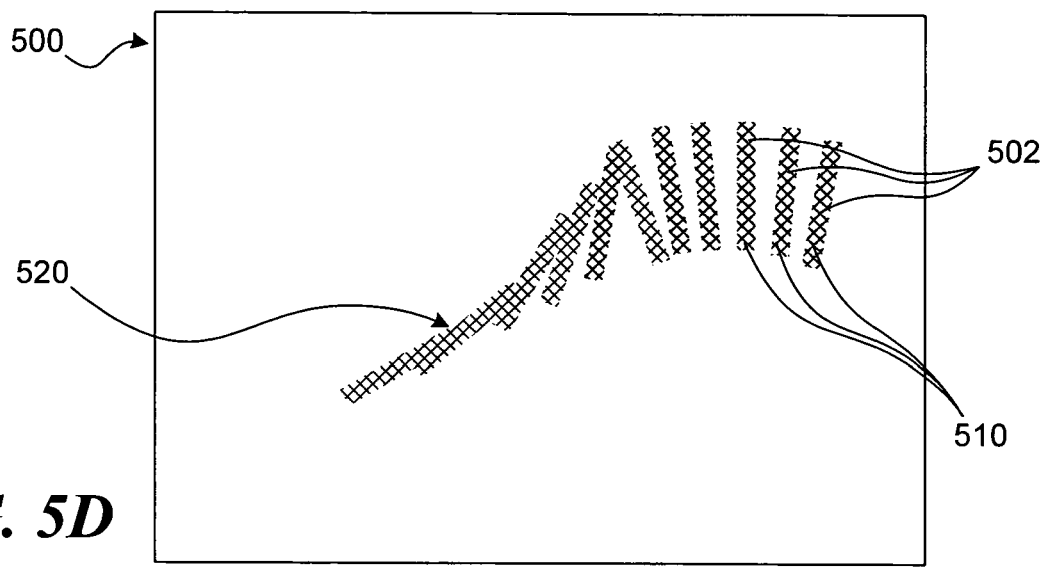
FIGS. 5D-5F illustrate a reverse view of the interactive display surface using the sets of points detected to generate the "painted" image

In FIG. 5D, sets of points 502 captured by IR video camera 68 in response to successive positions of tip 408 of paint brush 406 are filled with a pattern 510 representing a pattern and/or color selected by a user, such as color 414, which was selected by user and used in the virtual paint stroke shown in FIGS. 4A-4C. FIG. 5D illustrates composite image 520 projected by projector 70 on underside 500 of the interactive display surface resulting in virtual paint stroke 412 being presented on interactive display surface 400, as shown in FIGS. 4A-4C. Again, to illustrate the operation of this embodiment of the present invention, composite image 520 comprises delineated filled sets of points. The separation between the composite images is exaggerated in these views.

Figure 5E:
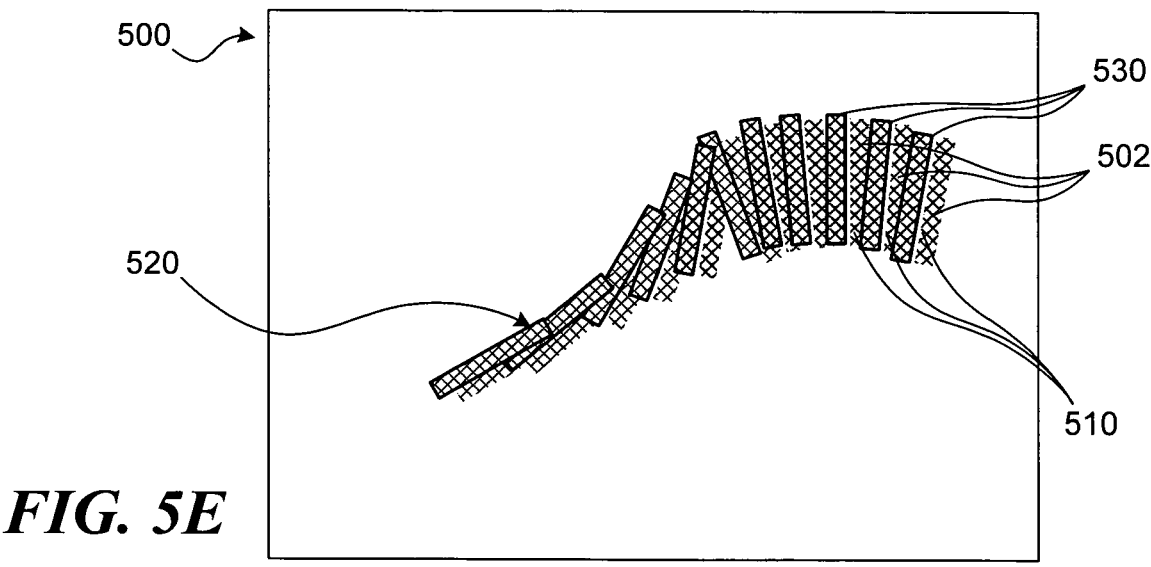
Figure 5F:
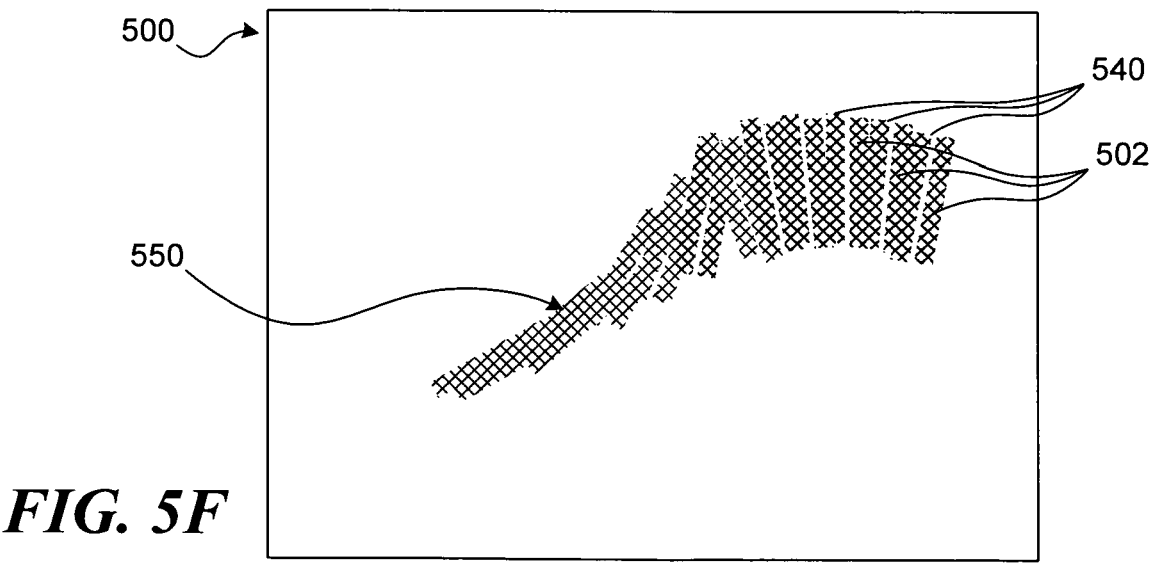

On the other hand, to enable a user to paint rapidly and continuously on interactive display surface 400 (or to compensate for using an IR video camera with too slow a capture rate), techniques are preferably used to fill gaps between the images related to captured sets of points 502. FIGS. 5E and 5F illustrate one such technique. In FIG. 5E, sets of points 502 actually detected in successive frame captures are composited or blended, so that each set of points 502 is filled and reproduced at an offset position relative to where each of the set of points was detected, producing duplicate sets of points 530. In FIG. 5E, duplicate sets of points 530 are outlined to distinguish them from sets of points 502 actually detected as a result of the presence of tip 408 of paint brush 406 on the interactive display surface. An adjusted composite image 550 shown in FIG. 5F includes original sets of points 502 and composited or blended sets of points 540 (which are identical to duplicate sets of points 530, but with the outlining removed). This adjusted composite image shows how use of compositing or blending makes the image seem more continuous than composite image 520, which only includes original sets of points 502.

Response of Interactive Display Surface to Objects Using Representative Ellipses In another embodiment of the present invention, instead of generating images based on actual sets of points captured by IR video camera as described above, images are created based on representative ellipses generated in response to the sets of points detected. Exemplary representative ellipses are shown in FIGS. 6A-6D.

Figure 6A:
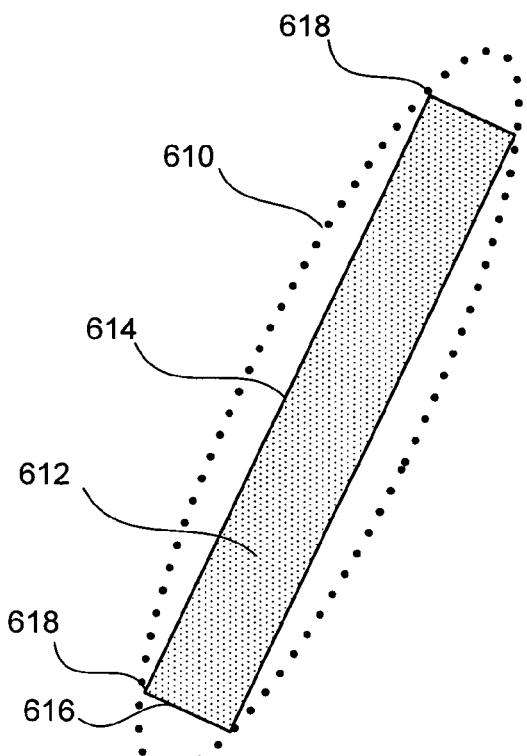
FIGS. 6A-6D illustrate embodiments of the present invention in which sets of points presented by the physical object are represented with alternative equivalent ellipses.

In FIG. 6A, an ellipse 610, which corresponds to a "bounding box," is created that is sufficiently large to surround outermost points of a connected component of detected points or pixels in the IR image produce by IR video camera 68. The set of detected points 612 is identified as a connected component. Outermost points of physical object 406 are those points at a periphery of a group of immediately adjacent points or pixels having a degree of IR reflectance above a threshold, indicating that the points or pixels are part of the same object, i.e., that the points or pixels are connected, as evidenced by their proximity to each other.

Whether the points or pixels are immediately adjacent to each other may be determined as a function of whether, for each point considered in the set, there are points adjacent thereto in each considered direction, which have an IR reflectance that is also above the predefined threshold. For example, a connectedness algorithm may evaluate whether each point is four-way connected in that the algorithm determines if each point or pixel is adjacent to any other points or pixels having an IR reflectance above the predefined threshold, in both the horizontal and vertical directions. Alternatively, as another example, a connectedness algorithm can evaluate whether each point or pixel is eight-way connected, by determining if each point or pixel adjacent thereto horizontally, vertically, and at both diagonals across the horizontal and vertical axes, also has a reflectance above the predefined threshold.

As described above, multiple physical objects may be disposed adjacent to interactive display surface 400, whether the physical objects are discrete objects or the multiplicity results from, for example, pressure applied to paint brush 406 by user's hand 404 causing bristles to spread apart into two or more distinct physical objects. The present invention can detect one or more connected components and process each connected component.

Figure 6B:
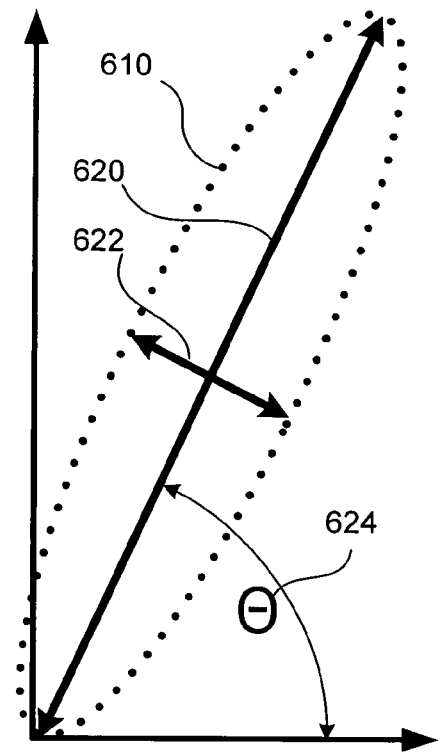
Figure 6C:
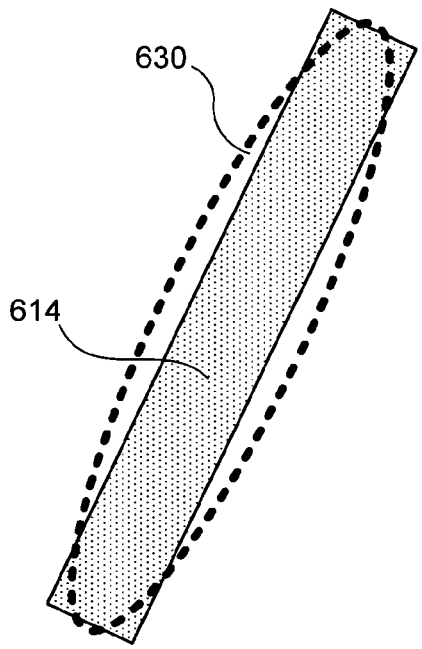

In FIG. 6A, ellipse 610 has dimensions sufficiently large to include outermost lateral sides 614, ends 616, and corners of set of points 612. If set of points 612 was not as regular as the shape of a rectangular set of points 612, ellipse 610 would be drawn in the size needed to encompass outermost points of each connected component presented. As shown in FIG. 6B, resulting ellipse 610 includes a major axis 620, a minor axis 622, and an orientation θ 624 representing an angular displacement of one of major axis 620 and minor axis 622 from a chosen frame of reference, such as the X or Y axis of the interactive display surface.

Alternatively, instead of using ellipse 610 that surrounds the outermost points of set of points 612, a second representative ellipse 630 is derivable from set of points 612 according to spatial moments of all immediately adjacent points or pixels determined to be part of a connected component represented by set of points 612. Set of points 612 is representable as an ellipse 630, so that points or pixels encompassed by the ellipse have the same variance from a central point or pixel. The central point is determinable by collecting horizontal and vertical coordinate positions of all those points or pixels determined to be connected, as described above, and then calculating a mean horizontal and a mean vertical position to determine a spatial center of the connected points.

Relative to the central points or pixels, each of the connected points or pixels has a spatial moment about the central point or pixel determined by its relative coordinate position to the spatial center. For example, where the spatial center is determined to be a point lying at coordinates $\bar{x}, \bar{y}$, the spatial moment of each point is determined by Eqs. (1), (2), and (3), which respectively define horizontal variance, vertical variance, and an orientation variance from a central point $\bar{x}, \bar{y}$:

$$\mu_{xx} = \frac{1}{A}\sum (x - \bar{x})^2 \quad (1)$$

$$\mu_{yy} = \frac{1}{A}\sum (y - \bar{y})^2 \quad (2)$$

$$\mu_{yx} = \frac{1}{A}\sum (y - \bar{y})^2 (x - \bar{x})^2 \quad (3)$$

An equivalent ellipse having equivalent moments reflecting both the size and orientation of the physical object represented by the equivalent ellipses is defined by Eq. (4), as follows:

$$R = \{(y,x) : dx^2 + 2exy + fy^2 \leq 1\} \quad (4)$$

where coefficients determining the ellipse are related to the spatial moments of the points by Eq. (5), as follows:

$$\begin{pmatrix} d & e \\ e & f \end{pmatrix} = \frac{1}{4\mu_{xx}\mu_{yy} - \mu_{yx}^2} \begin{pmatrix} \mu_{yy} & -\mu_{yx} \\ -\mu_{yx} & \mu_{xx} \end{pmatrix} \quad (5)$$

Figure 6D:
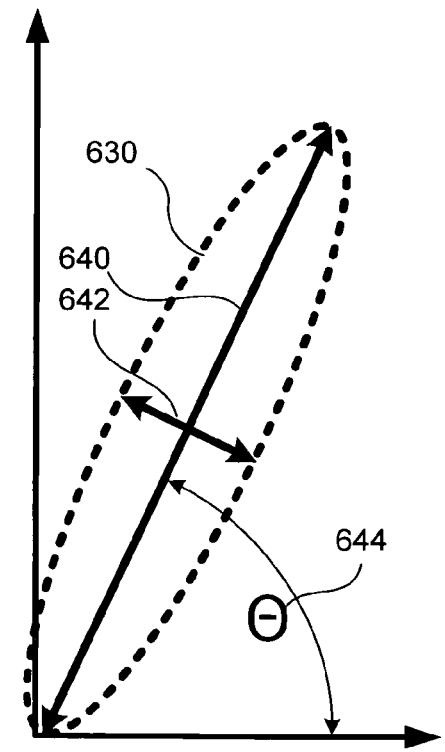

Thus, ellipse 630, which is representative of the size and orientation of physical object 406, can be determined from Eq. (4) and (5). From Eq. (4), changes in orientation of ellipse 630 can be determined to determine changes in orientation of set of points 612. As shown in FIG. 6D, analogous to ellipse 610, ellipse 630 includes a major axis 640, a minor axis 642, and an orientation θ 644 representing an angular displacement of one of major axis 620 and minor axis 622 from a chosen frame of reference.

The dimensions of ellipse 630, like the dimensions of ellipse 610, will vary according to the number, position, and geometry of set of points 612. Also similar to ellipse 610, a number of different physical objects can potentially be represented by ellipse 630. However, because the sizes and orientations of ellipses 610 and 630 will change for each of many sets of points, representing set of points 612 by an equivalent ellipse sufficiently distinguishes between types of objects to accurately portray drawing or painting with a physical object presenting the set of points and thereby facilitates the present invention.

In a manner comparable to FIGS. 5A-5C, FIGS. 7A-7C illustrate a reverse view 700 of the interactive display surface, illustrating how the interactive display surface detects connected components 702 presented by a physical object. The system coupled to the interactive display surface represents each set of points captured during a series of capture intervals with an equivalent ellipse 710. By detecting sets of points 702 and representing connected components 702 with equivalent ellipses 710, the system coupled to interactive display surface 400 detects and tracks an object, such as paint brush 406, to generate and display a corresponding virtual paint stroke (FIGS. 4A-4C). Equivalent ellipses 710 have a major axis 712, a minor axis 714, and an orientation angle (not specifically shown for sake of visual simplicity). Once again, in FIGS. 5A-5C, user's hand 404 and brush 406 are represented in phantom form by a dotted outline for perspective, although interactive display surface 400 does not respond to user's hand 404 and paint brush 406, but only to objects touching (or nearly touching) interactive display surface 400, such as tip 408 of brush 406.

Once again, it should be noted that connected components 702 are all uniformly rectangular and, therefore, representative ellipses 710 are consistent in shape and size, changing only in orientation. However, once again, the fact that connected components 702 are rectangular and unchanging represents merely an illustrative example of sets of points representative of a physical object used to paint on interactive display surface 400, as described above in connection with FIGS. 5A-5C.

The capture intervals, in one embodiment of the invention, correspond with the frames captured by IR video camera 68 (FIG. 2). Images are generated on interactive display surface 400 in accordance with sets of points detected on underside 500 of the interactive display surface. More specifically, FIG. 7A corresponds with FIG. 4A, with FIG. 4A showing a virtual paint stroke generated in response to a connected component 702, which corresponds to tip 408 of paint brush 406 touching interactive display surface 400.

Figure 7A:
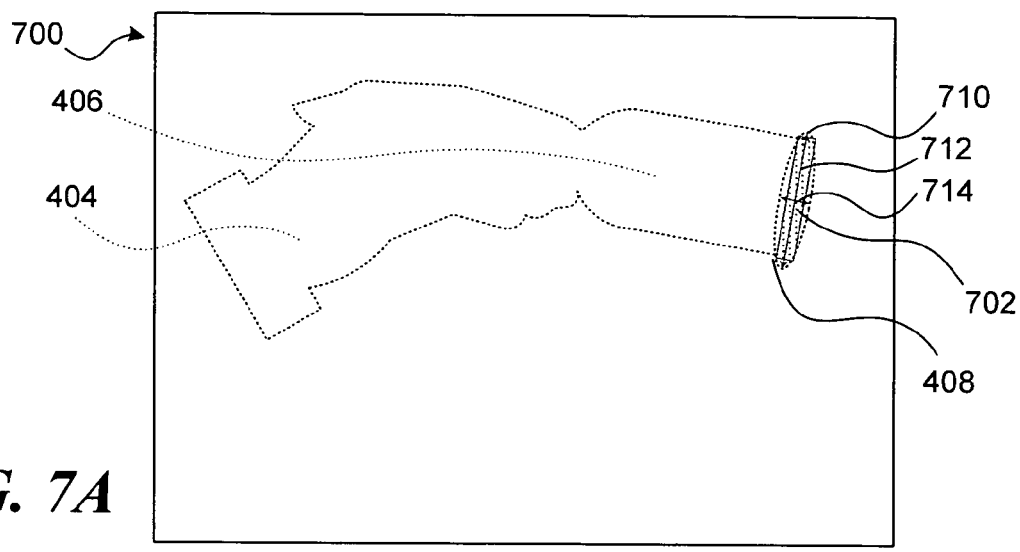
FIGS. 7A-7C illustrate a reverse view of the interactive display surface, showing how the interactive display surface detects sets of points presented by the physical object and represents each set of points with an equivalent ellipse during a series of capture intervals.
Figure 7B:
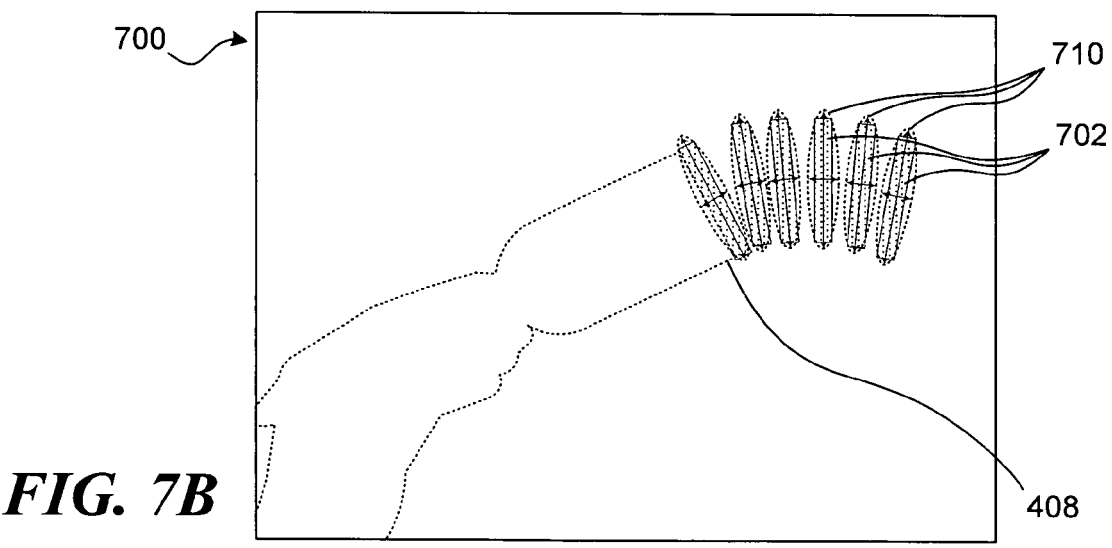
Figure 7C:
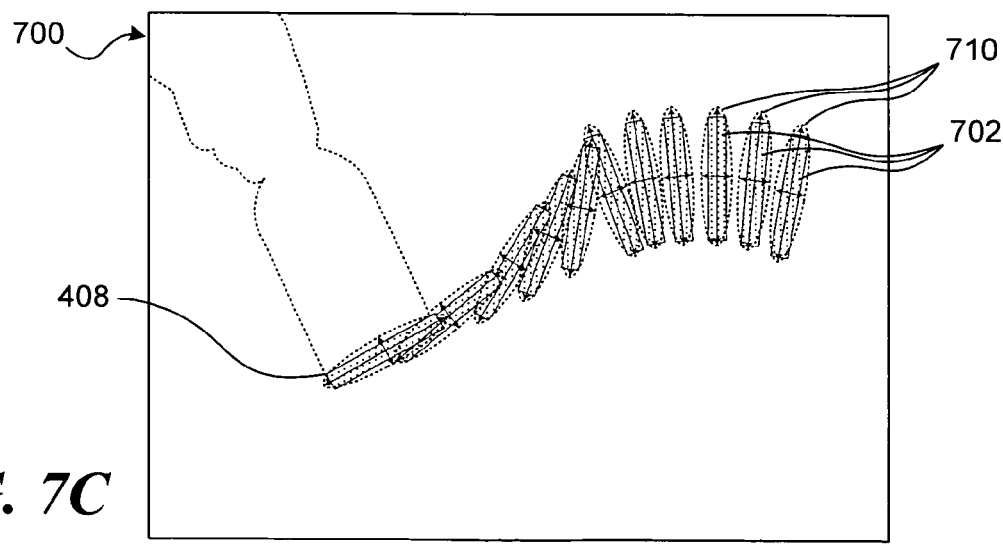

As shown in FIGS. 7B and 7C, equivalent ellipses 710 represent connected components 702 detected and captured by IR video camera 68 over time; these connected components correspond to the tip 408 of paint brush 406 touching interactive display surface 400 over time. Equivalent ellipses 710 representing sets of points 702 captured are maintained, resulting in the virtual paint stroke shown in FIGS. 4A-4C, which is described further below.

As in the case of FIGS. 5A-5C, a composite of images generated in response to sets of points in FIGS. 7A-7C leaves gaps, in this case, between representative ellipses. Gaps may be caused by IR video camera 68 (FIG. 2) not having a sufficiently rapid frame rate to keep up with user's painting stroke. Further, in the present embodiment of the invention where connected components 702 are represented with ellipses, the nature of ellipses tends to leave gaps in the composite image. To fill these gaps, one or more sets of axes of the representative ellipses 710 are joined by lines and the space bounded by the connecting lines is filled to create the composite image. The positions of the end points of the axes are derivable from coefficients that determine the ellipses which, in turn, are derivable from Eq. 5 as described above.

Figure 7D:
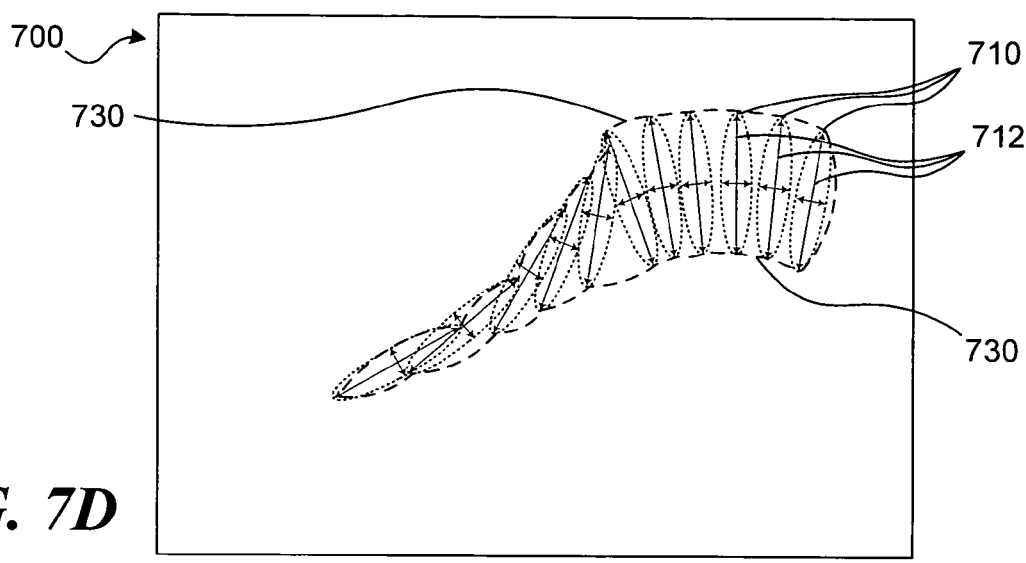
FIGS. 7D-7G illustrate a reverse view of the interactive display surface, showing the use of the sets of points detected to generate the "painted" image.
Figure 7E:
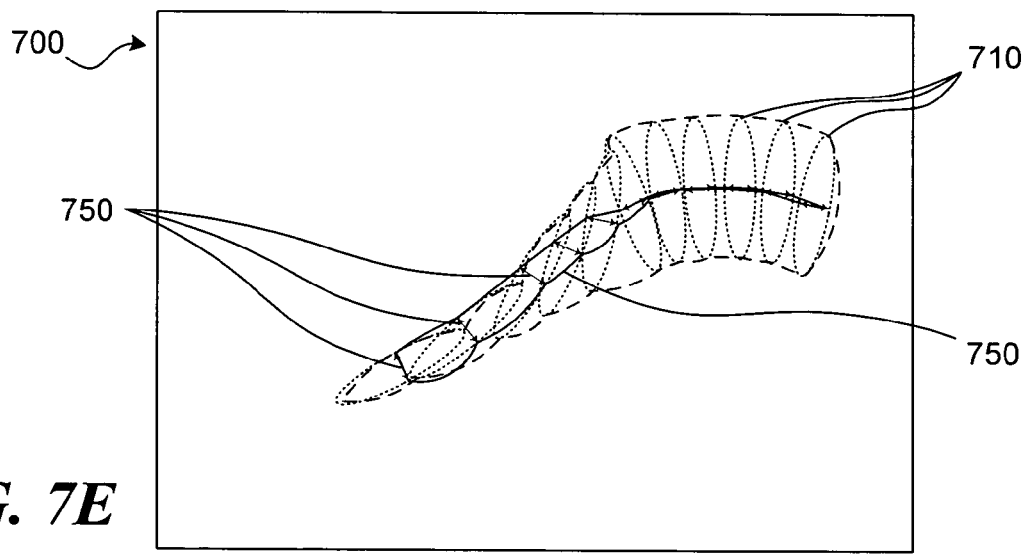
Figure 7F:
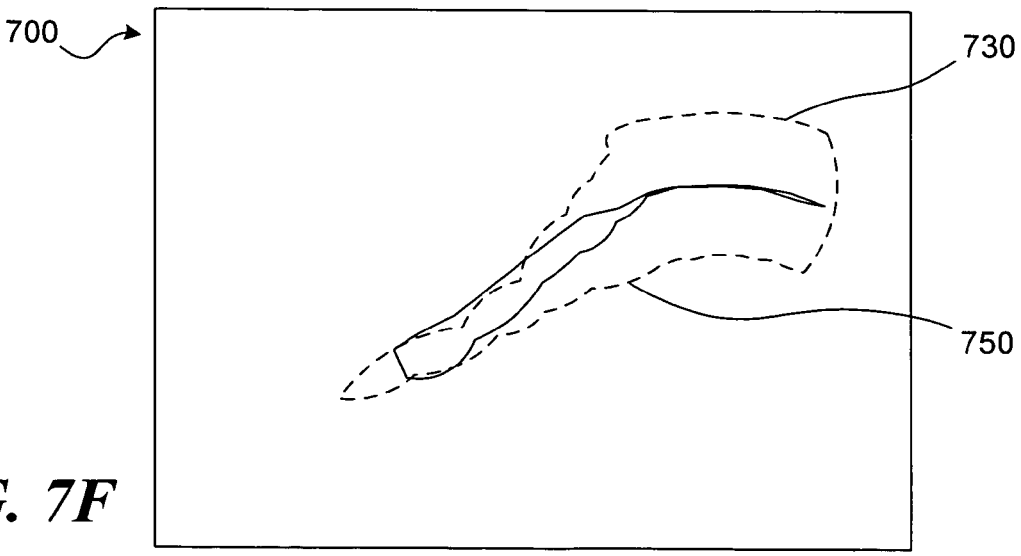

For example, in FIG. 7D, ends of the major axes 712 of each of representative ellipses 710 are joined by lines 730. In FIG. 7E, ends of minor axes 714 of each of the representative ellipses are joined by lines 750. In FIG. 7F, representative ellipses 710 are removed showing the form or overall stroke created by lines 730 and 750, which connect the ends of major axes 712 and minor axes 714, respectively, of the representative ellipses. As can be seen from FIG. 7F, line 730 joining ends of the major axes 712 by itself largely represents a continuous painted stroke image corresponding to that shown in FIGS. 4A-4C. Line 750 joining ends of minor axes 714 is largely engulfed within bounds of line 730. However, because of the rotation of paint brush 406 shown in FIG. 4C, line 730 joining major axes 714 flattens and intersects line 750, where brush 406 was rotated sideways, line 750 enables the coverage caused by movement of brush 406 to be fully represented.

Figure 7G:
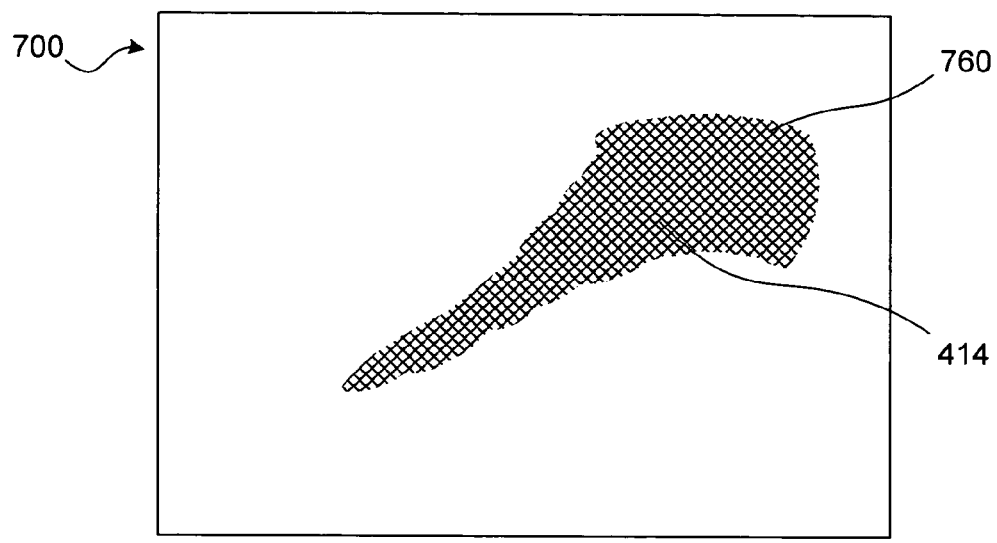
Figure 7H:
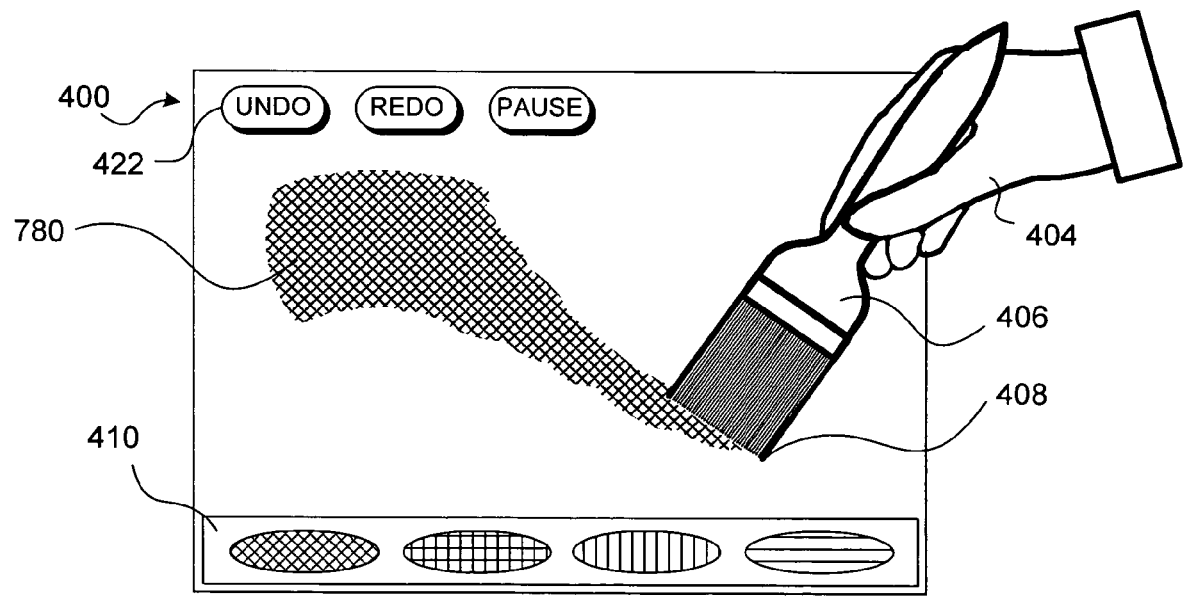
FIG. 7H illustrates the resulting view seen by a user of the image generation process of FIGS. 7A-7G.

In FIG. 7G, a composite area 760 circumscribed by outermost of lines 730 and 750 is filled in with paint color 714 or a pattern. Reversing the view to a point above interactive display surface 400, FIG. 7H shows a resulting image 780 corresponding to movements of paint brush 406, as shown in FIG. 4C, are generated by the filling of representative ellipses 710 and axes-connecting lines 730 and 750.

Response of the Interactive Display Surface to Multiple Separate Objects

As described above, interactive display surface 400 may respond to multiple physical objects disposed adjacent to the interactive display surface at one time, by accumulating images of sets of points 502 as described in connection with FIGS. 5A-5F, or by using representative ellipses 710 to generate images of captured sets of points 702, as described in connection with FIGS. 7A-7H.

Figure 8A:
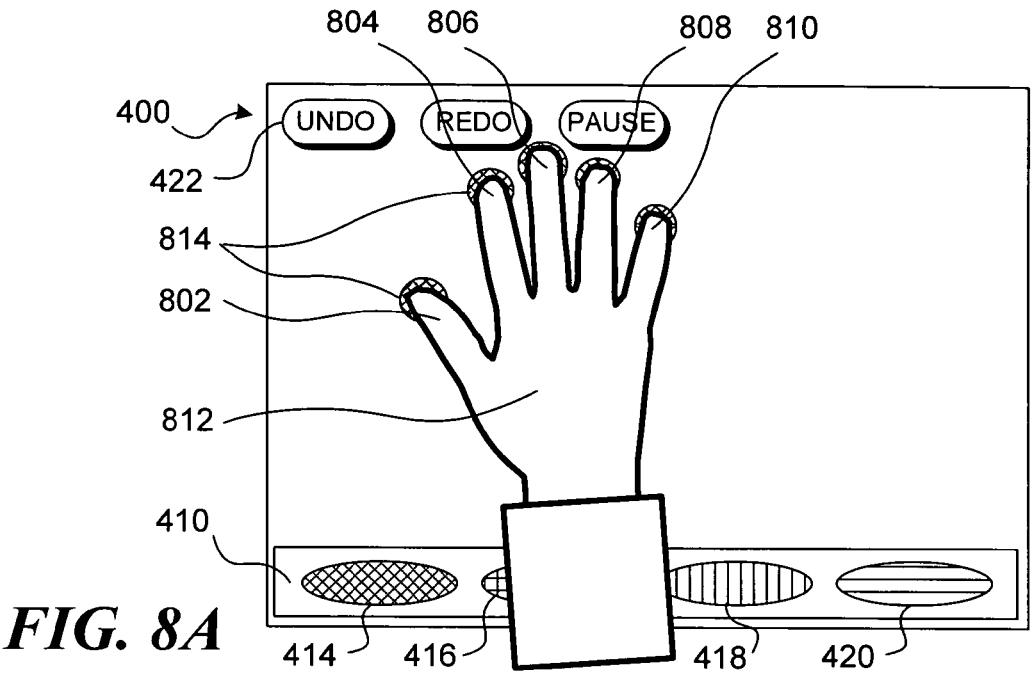
FIGS. 8A-8B illustrate a user employing fingers of the user's hand to generate an image from multiple connected components.

In FIG. 8A, generating an image using multiple physical objects is shown using the example of a user choosing to "finger paint" on interactive display surface 400 with thumb 802 and fingers 804, 806, 808, and 810 of user's hand 812. With the same hand 812, user can select one of a number of paint patterns or colors 414, 416, 418, and 420 from palette 410 by touching user's thumb 802 or one of user's finger's 804-812 to the desired pattern or color 414-420. Also, the user can actuate virtual buttons 422 to undo, redo, or pause painting and drawing functions.

Figure 8B:
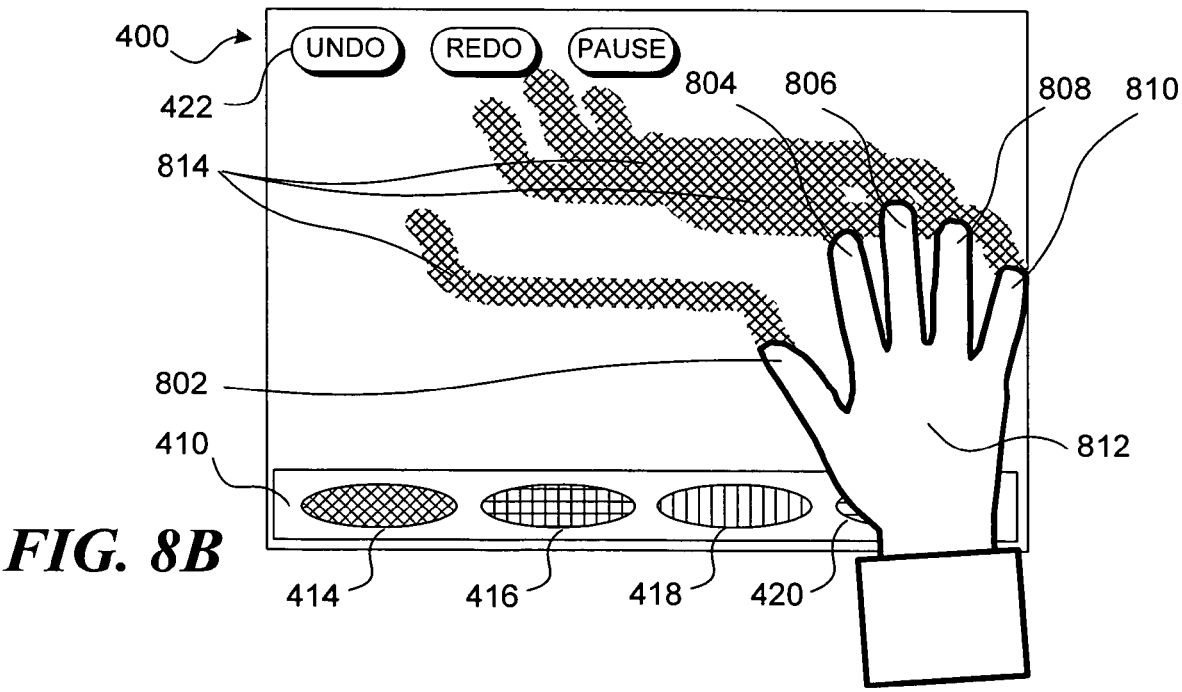

More particularly, as shown in FIG. 8A, as the user touches thumb 802 and fingers 804-810 to interactive display surface, a blot of virtual paint 814 appears on interactive display surface 400 where each digit 802-810 touches interactive display surface 400. This blot of virtual paint is comparable to the virtual paint that appeared in FIG. 4A when tip 408 of paint brush 406 touched interactive display surface 400. Blots of virtual paint 814 are slightly exaggerated in FIG. 8A to make each blot more visible. Each of blots 814 are generated with accumulated images or representative ellipses as described above. Moreover, as illustrated in FIG. 8B, as user's hand 812 moves the thumb and fingers across interactive display surface 400, virtual paint blots 814 create strokes on the interactive display surface in response to the user's movements, following the motion of each of digits 802-810 to present distinct and/or overlapping strokes as a function of the position and movement of user's digits 802-810.

It should be noted that the response of the present invention to multiple physical objects disposed adjacent to interactive display surface 400 provides much greater flexibility and realism than are offered by conventional paint or drawing programs, even those that are designed to operate in connection with touch-sensitive display screens. As described above, the present invention permits a user to interact directly with the virtual canvas presented by the interactive display surface, and the user is no longer limited to trying to create images by dragging a mouse across a desk. Moreover, by being responsive to shapes of physical objects and/or to multiple physical objects, the present invention responds more realistically when the physical objects are moved across the interactive display surface. For example, as described above, changing the pressure on a paint brush changes the shape of the brush bristles in contact with the interactive display surface and results in differently shaped paint lines comprising a paint stroke appearing on interactive display surface 400. Similarly, if part, but not all, of a brush is lifted away from interactive display surface 400, the shape and size of the paint stroke appearing on interactive display surface 400 changes. Further, as a function of the resolution of IR video camera 68 and projector 70, interactive display surface 400 can track and respond to small, discrete groupings of bristles, or even individual bristles. Embodiments of the present invention thus are highly responsive to the user and very realistic in generating images.

Time- and Condition-Dependent Responses of the Interactive Display Surface

Figure 9A:
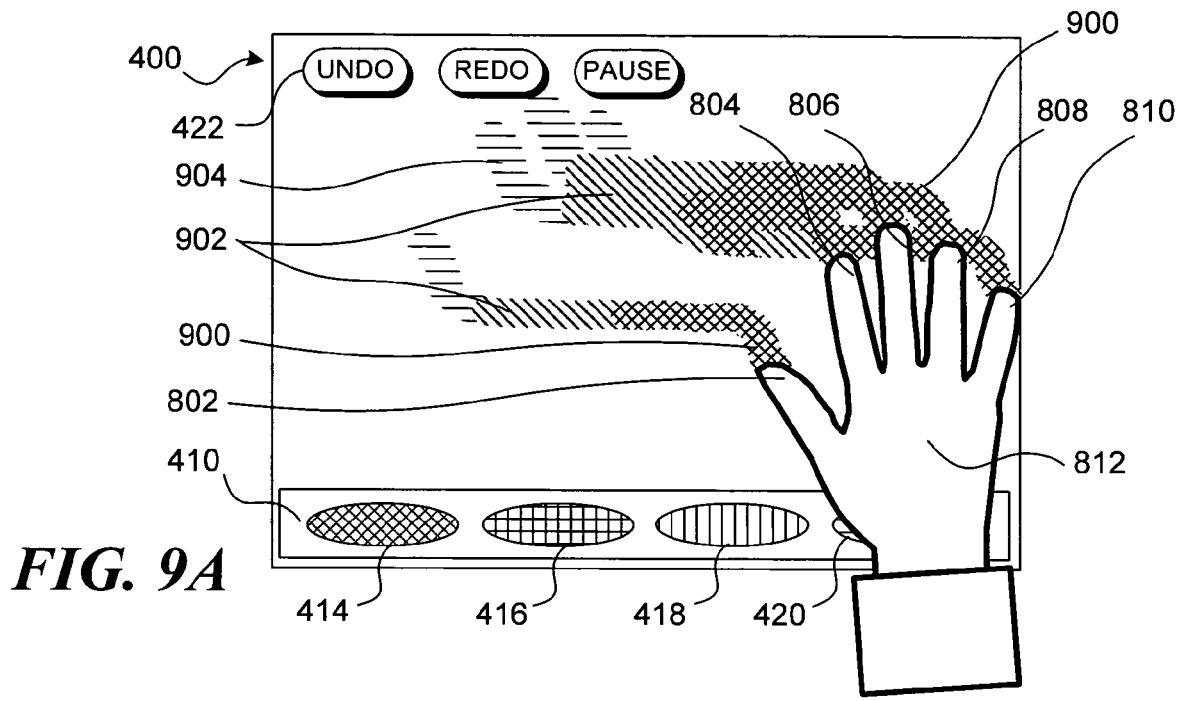
FIG. 9A illustrates an embodiment where previously generated images are faded out over time.

The present invention can also alter images based on time and other factors. In FIG. 9A, interactive display surface 400 illustrates an embodiment where a user finger painted an image comparable to the images shown in FIG. 8B. However, in FIG. 9A, the images created are time-dependent. More specifically, images "painted" on the interactive display surface fade out over time, resulting in a work that is interactively dynamic, based on the user's actions.

More particularly, as shown in FIG. 9A, as user's hand 812 moves across interactive display surface 400, virtual paint 900 is presented on interactive display surface 400 tracing movements of user's digits 802-810. Virtual paint close to user's hand 812 and, thus, more recently painted remains at the color and/or intensity originally displayed. However, virtual paint 902 and 904 that are further removed from the current point of contact of the user's hand with the interactive display surface than virtual paint 900 have begun to fade. Virtual paint 902, adjacent virtual paint 900 and closer to and more recently created by user's hand 812, changes or fades to a different pattern or color. Virtual paint 904, even further removed from user's hand 812 and thus, less recently generated than virtual paint 902, changes or fades to a still a different pattern or color. As a result, the user can continue to interact with interactive display surface 400 and produce continually changing images. It will be appreciated that one of the virtual buttons 422 enabling user to "PAUSE" activities of interactive display surface 400 enables a user to freeze images created and stop any time-dependent effects from further progressing.

Figure 9B:
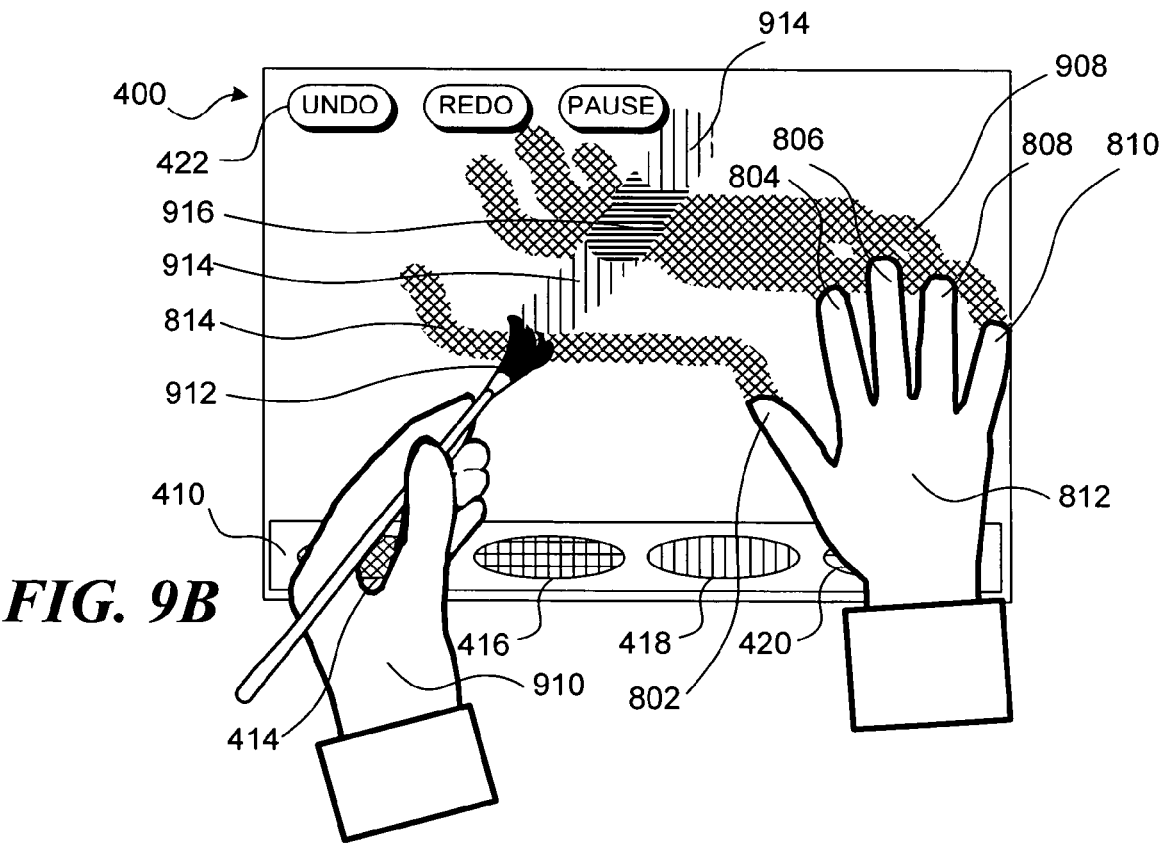
FIG. 9B illustrates an embodiment where "painting" images over previously-created overlapping images changes attributes of the overlapping image.

In FIG. 9B, a different effect supported by interactive display surface 400 is illustrated. As in FIG. 8B, in FIG. 9B, the user has moved hand 812 to create virtual paint 814. It is assumed for the sake of FIG. 9B that virtual paint 814 does not change with time as in FIG. 9A. However, in FIG. 9B, the user employs the user's other hand 910 to move paint brush 912 across interactive display surface 400 to create a virtual paint stroke 914. Virtual paint stroke 914 is filled with pattern 418 when generated and displayed on interactive display surface 400 in an otherwise unused space. On the other hand, when virtual paint stroke 914 crosses or overlaps with virtual paint 814, a different color or pattern 916 appears in the overlapping area. Different color or pattern 916 may be a conventional spectral blending, e.g., if virtual paint 814 is red and virtual paint stroke 914 is blue, the resulting color in the area of overlap will be purple. Alternatively, resulting color or pattern 916 may include a randomly generated pattern or color, or a pattern or color that is randomly generated according to time or that changes over time, or any other pattern that may be displayed by interactive display surface 400.

Use of Physical Objects Presenting Images Such as Pictures or Stamps

Figure 10A:
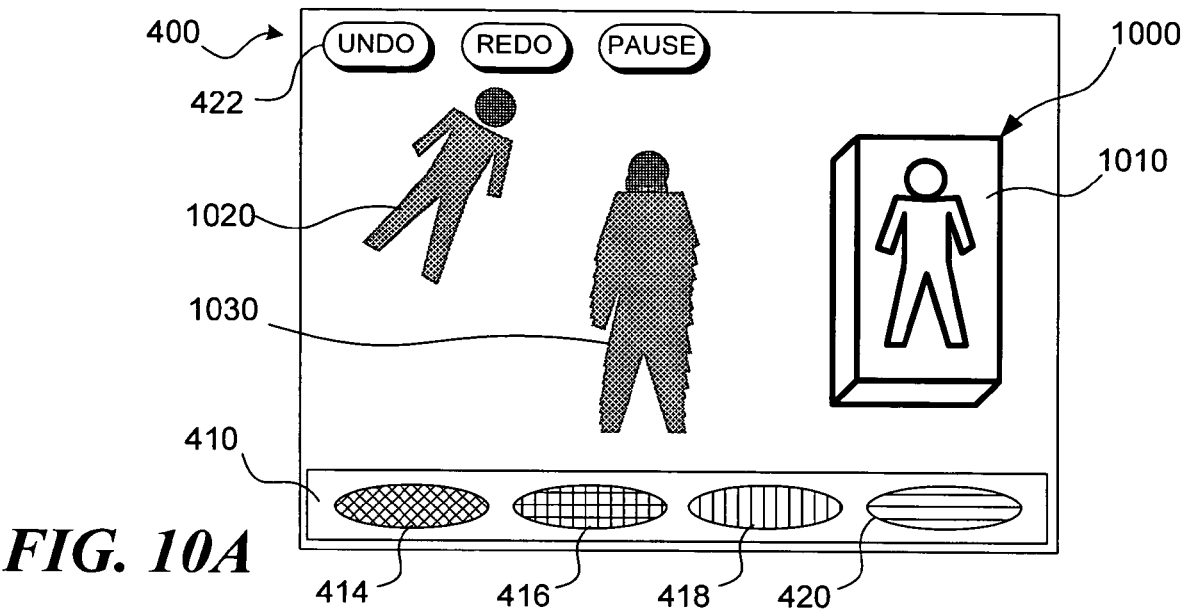
FIGS. 10A-10B illustrate creation of images using physical objects presenting shapes to the interactive display surface as a result of the reflectivity of a surface of the physical objects.
Figure 10B:
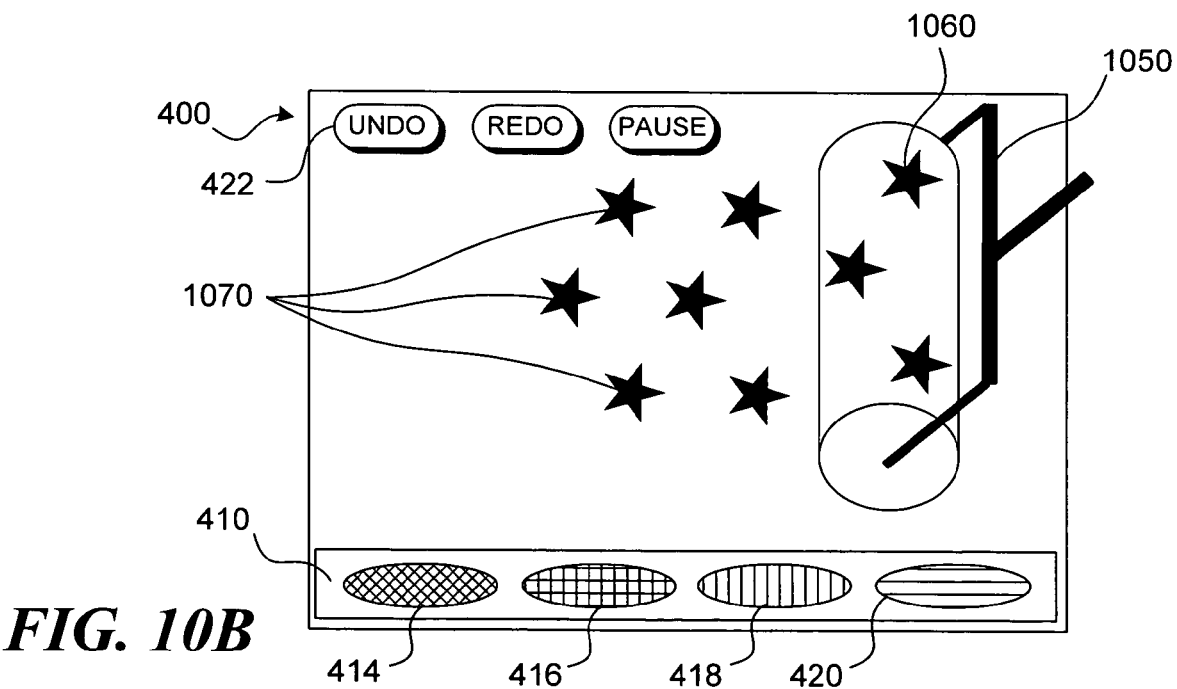

Because the present invention can respond to physical objects placed adjacent interactive display surface 400, based on the reflection of IR light generated by IR source 66 (FIG. 2), a user is not limited to using conventional painting or drawing tools or implements, such as brushes, or even limited to three-dimensional objects in creating images on interactive display surface 400. FIGS. 10A-10B illustrate the creation of images using physical objects presenting shapes, which are applied to the interactive display surface. The shapes are detected as a result of the IR light reflectivity of a surface of the physical objects that contacts the interactive display surface.

In FIG. 10A, for example, a user uses a stamp 1000 to create images on the interactive display surface. Stamp 1000 is three-dimensional and disposed on its lower surface (which is turned upwardly in FIG. 10A), stamp 1000 includes a raised portion 1010, formed in a desired shape. The raised portion extends outwardly from of the rest of stamp 1000. Because raised portion 1010 on the lower surface of stamp 1000 extends outwardly and contacts the interactive display surface, the shape of the raised portion is detected when stamp 1000 is placed on interactive display surface 400, causing the paint program to produce a corresponding image. Thus, placing stamp 1000 on interactive display surface 400 appears to leave a virtual imprint of the shape, such as virtual imprint 1020. Moreover, dragging stamp 1000 across interactive display surface 400 may leave a streaked virtual imprint having contours at leading and trailing edges that follow the shape of raised portion 1010 on the bottom of stamp 1000, such as illustrated by streaked virtual image 1030. Any physical object with a textured surface can be used like stamp 1000 to leave a virtual imprint or a streaked virtual imprint.

It should be appreciated that, because interactive display surface 400 responds to reflected IR light, stamp 1000 could be a two-dimensional object such as a photograph or a drawing. Thus, instead of stamp 1000 being three-dimensional with a handle portion and an image extending outwardly from the handle portion, stamp 1000 may consist of a picture having a background that reflects IR light differently than a foreground subject in the picture. A picture, such as a drawing or a photograph, therefore, may be used to create virtual imprints of the picture, or a streaked virtual image of the picture.

In addition, as shown in FIG. 10B, a roller stamp 1050 may be used to create images on interactive display surface 400. Again, because interactive display surface 400 responds to reflected IR light, roller stamp 1050 may present images 1060 that are raised or differently colored (i.e., have a different IR light reflectance). Rolling roller stamp 1050 across interactive display surface 400, thus, also can be used to "deposit" a series of images 1070 on interactive display surface.

Taking advantage of the capabilities of interactive display surface 400, users can adjust the color or pattern deposited by stamps or pictures by making a selection from palette 410. Again, a user can make such a selection by touching the stamp or another physical object to one of the patterns or colors 414-420 palette 410, just as user might indicate such a selection for use with a brush or other chosen drawing tool or implement.

Logical Steps for Generating Images in Response to Movement of Physical Object

Figure 11:
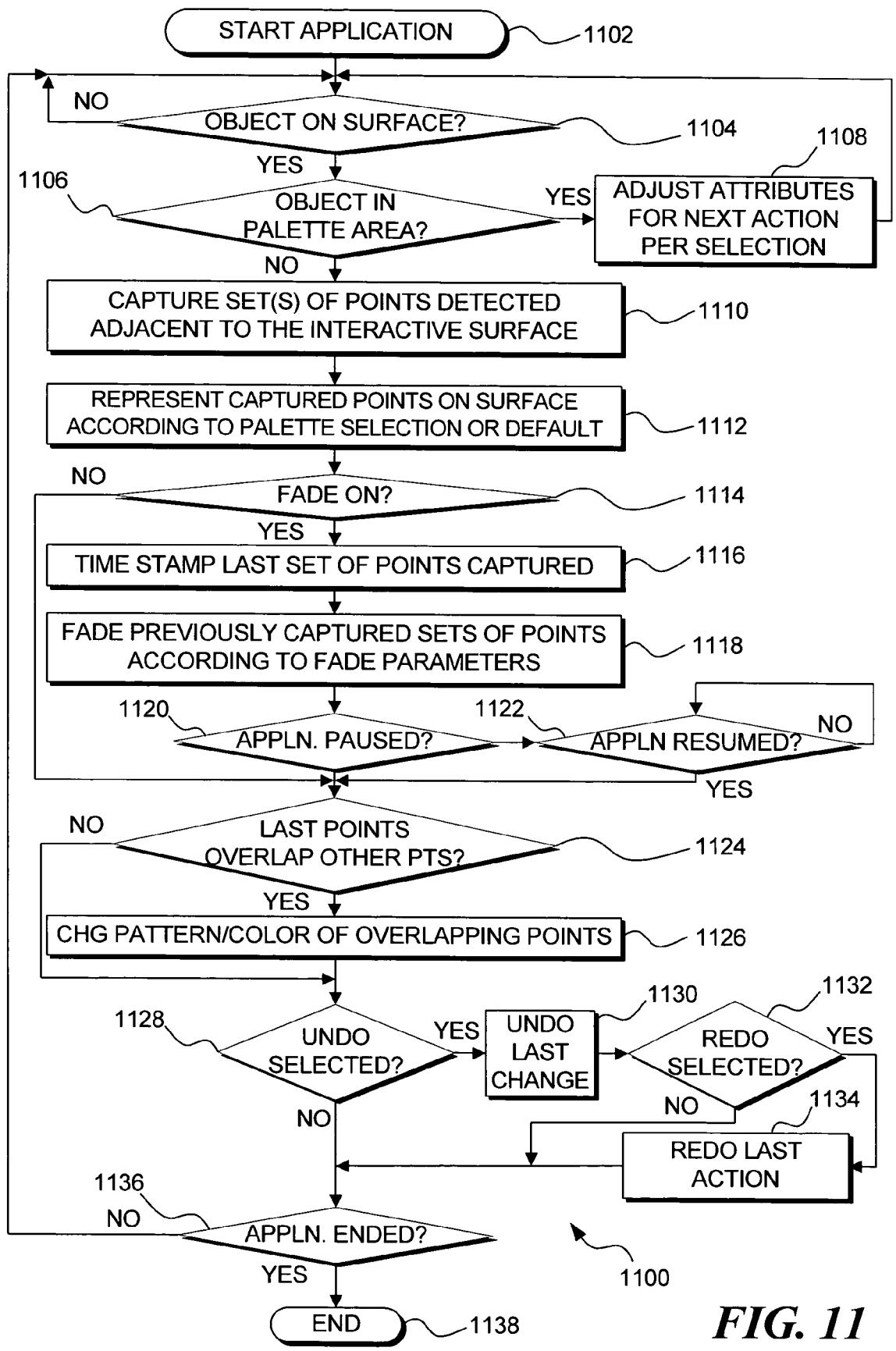
FIGS. 11 and 12 are flow diagrams illustrating the logical steps of generating images according to different embodiments of the present invention.
Figure 12:
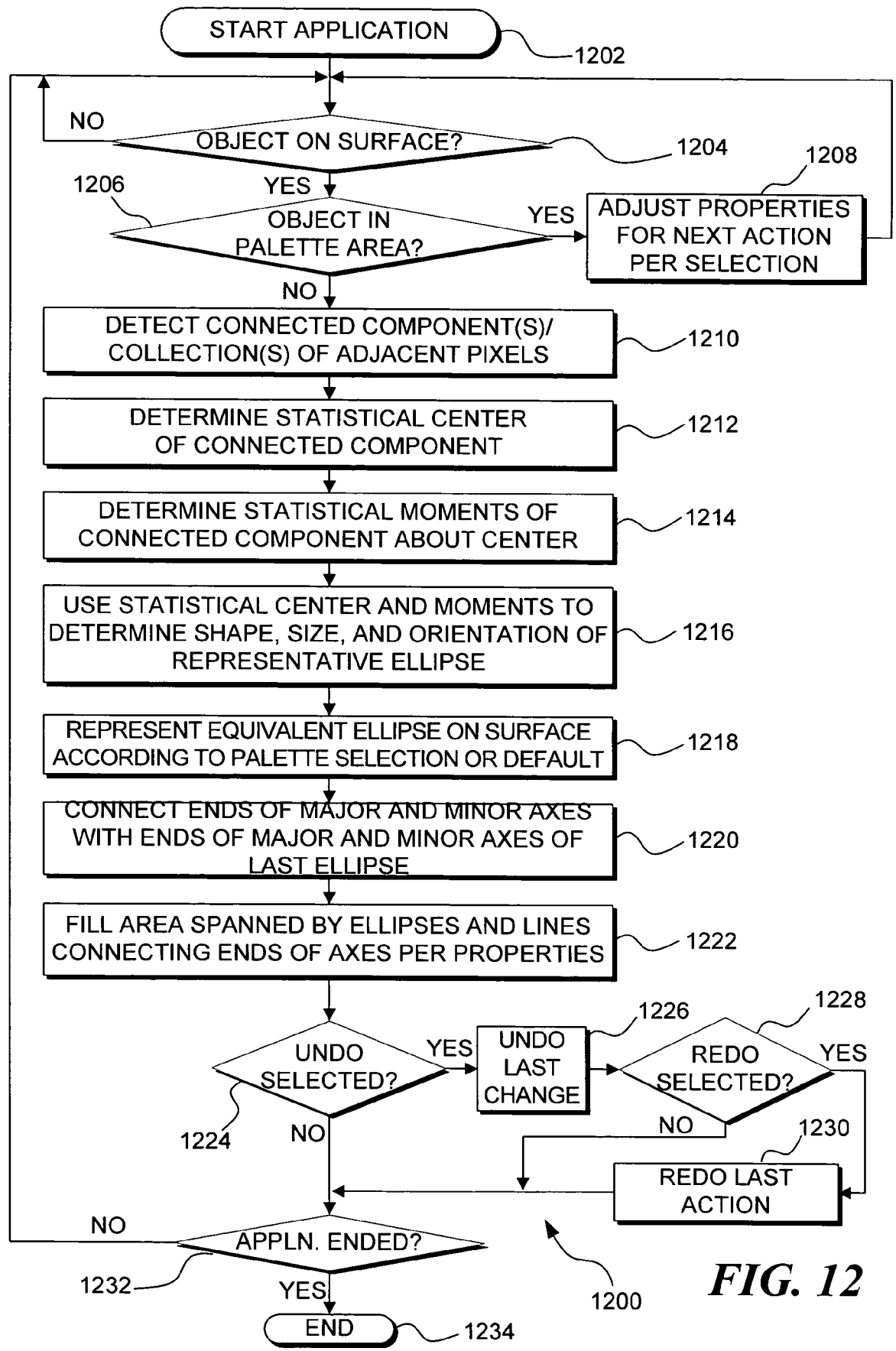

FIGS. 11 and 12 are flow diagrams illustrating the logical steps of generating images in accord with the present invention. In FIG. 11, a flow diagram 1100 illustrates the logical steps for generating images on the interactive display surface by capturing sets of points and generating responsive images, generally as described above in connection with FIGS. 5A-5F.

Flow diagram 1100 begins with a step 1102 where an application for generating images is started or launched. At a decision step 1104, it is determined if a physical object is disposed adjacent the interactive display surface. If not, flow diagram 1100 loops back to decision step 1104 until a physical object is disposed adjacent the interactive display surface. Once a physical object is detected adjacent the interactive display surface at step 1104, in a decision step 1106, the logic determines if the object is disposed in a selection area of the palette on the interactive display surface. If so, at a step 1108, attributes are adjusted in preparation for the next action taken by the user on the interactive display surface—other than making another palette selection, which a user is always free to do. Thus, for example, if a user selects a particular color or fill pattern from the palette, the selected color or fill pattern will be applied when the user next paints, draws, stamps, or otherwise engages the interactive display surface with the physical object.

Although not shown in flow diagram 1100, it should be noted that the user interface may also enable a user to change attributes of images or parts of images after the images have already been created on the interactive display surface. Facilities enabling a user to select a portion of an image and change the attributes of that selection will be readily understood by those of ordinary skill in creating conventional drawing and painting programs that use a typical pointing device to produce paint or drawing strokes. The present invention enables a user to make selections and change attributes with menus presented on the interactive display surface using a physical object—even the user's finger. Alternatively, a user may make such changes using an alternative input device, such as pointing device or keyboard that is associated with the computer system coupled with the interactive display surface.

Referring back to flow diagram 1100, if it is determined at decision step 1106 that the physical object disposed adjacent to the interactive display surface is not in the palette area, at a step 1110, sets of points corresponding to the reflected IR light from the physical object detected by the system coupled to the interactive display surface are captured as described above in connection with FIGS. 5A-5C. At a step 1112, points captured at step 1110 are represented on the interactive display surface with attributes set according to the palette selection previously made or, if no such selection was made, according to a default set of attributes.

At a decision step 1114, the logic determines if a fade setting has been activated. As described above in connection with FIG. 9A, the system coupled to the interactive display surface may cause previously-generated images to fade, thereby creating a dynamically changing image. If it is determined that the fade setting is not activated, flow diagram 1100 proceeds to a decision step 1124. On the other hand, if it is determined at decision step 1114 that the fade setting is activated, then at a step 1116, the last set of points captured and represented on the interactive display surface is time-stamped. At a step 1118, previously captured and represented sets of points are caused to fade according to fade parameters and based upon the time stamps associated with previously captured and represented sets of points. Once again, the fade setting may be changed by engaging a menu presented on the interactive display surface with a physical object, or by using another user input device that is coupled to the associated computer system.

At a decision step 1120, the logic determines if the user has paused the application, such as by engaging a virtual control button 422 (FIGS. 4A-4C) on the interactive display surface. If the fade setting is active, the pause function enables a user to preserve the status of the display, thereby stopping further changes to the image caused by fading. If it is determined at decision step 1120 that the application has been paused, at a decision step 1122, the logic determines if the application has been resumed. A user might resume an application by toggling a virtual control button, or the application pause may time-out, or another action by the user may indicate that the pause state should be ended. If it is determined at decision step 1122 that the application has not resumed, flow diagram 1100 loops around decision step 1122. Once it is determined that the application has resumed, flow diagram 1100 proceeds to decision step 1124.

At decision step 1124, the logic determines if the last set of points captured overlaps other points represented on the screen. If not, flow diagram 1100 proceeds to a decision step 1128. On the other hand, if the last captured set of points does overlap other currently represented points, at a step 1126, the pattern or color of the overlapping points is changed as described in connection with FIG. 9B. Such overlapping settings may be changed using a menu or other input means used to make fade settings, as described above in connection with step 1118.

At a decision step 1128, it is determined if an undo function has been selected. If not, flow diagram 1100 proceeds to a decision step 1136. On the other hand, if an undo function has been selected, at a step 1130, the last change to the image made by the user is undone. It will be understood by those of ordinary skill in the programming arts, that a queue or stack of one or more previously executed operations can be maintained to permit the last change to be undone, to restore the application to the status existing prior to the last change. An operation maintained in the queue might, for example, be a stroke made with the paintbrush, where the stroke starts when the user places the brush down on the display surface and ends when the user lifts the brush from the display surface. Once the last change has been undone at step 1130, at a decision step 1132, it is determined if a redo function has been selected. If so, the last change undone at step 1130 is redone at a step 1134. Again, it will be understood that a queue or stack of undone operations can be preserved by the application program until a next new action is taken to sever the chain of undone selections. On the other hand, if it is determined at decision step 1132 that a redo function has not been selected, flow diagram 1100 proceeds to a decision step 1136.

At decision step 1136, it is determined if the application had been terminated by a user or otherwise has ended. If so, the flow diagram 1100 proceeds to a step 1138 where the flow diagram ends. On the other hand, if it is determined at decision step 1136 that the application has not ended, flow diagram 1100 loops to decision step 1104 to determine if a physical object has been disposed adjacent the interactive display surface.

It will be appreciated that the logical steps of flow diagram 1100 are conducted very rapidly. As a result, in the example presented above, of a brush being dragged across the interactive display surface, at step 1110, the points detected are captured and imaged, the remaining appropriate logical steps of flow diagram 1100 are conducted, and flow diagram 1100 loops to step 1110 to capture a next set of points captured as the brush continues to move across the screen.

In FIG. 12, a flow diagram 1200 illustrates the logical steps for generating images presented on the interactive display surface by detecting sets of points and generating representative ellipses and joining discrete images with connecting lines as discussed above in connection with FIGS. 6A-7H. For the sake of avoiding repetition, discussion of the fade and overlap options described in connection with flow diagram 1100 of FIG. 11 are omitted from flow diagram 1200. It will be understood that fade and overlap operations can be employed in connection with practicing the present invention using representative ellipses.

Flow diagram 1200 begins with a step 1202 where an application for generating and displaying images in a paint program is started or launched. At a decision step 1204, it is determined if a physical object is disposed adjacent the interactive display surface. If not, flow diagram 1200 loops back to decision step 1204 until a physical object is disposed adjacent the interactive display surface. Once a physical object is detected adjacent the interactive display surface at step 1204, at a decision step 1206, it is determined if the object is disposed in a selection area of the palette on the interactive display surface. If so, at a step 1208 attributes are adjusted for a next action taken by the user on the interactive display surface according to the selection made.

On the other hand, if it is determined at decision step 1206 that the physical object disposed adjacent to the interactive display surface is not in the palette area, at a step 1210, one or more connected components or sets of adjacent pixels is detected, as described above in connection with FIG. 6A. At a step 1212, a statistical center of the connected component is determined. At a step 1214, statistical moments of the points making up the connected component about the statistical center are determined. At a step 1216, using the statistical center and moments, an equivalent ellipse representative of the set of points detected in the one or more connected components is produced. Determination of an equivalent ellipse is described above in connection with FIGS. 6C and 6D and Eqs. (1)-(5). At a step 1218, the equivalent ellipse is represented on the interactive display surface, and the ellipse is filled with a pattern or color selected from the palette (or with a default color or pattern if none was selected).

At a step 1220, as described in connection with FIGS. 7D-7F, ends of axes of the representative ellipse generated at step 1218 are joined with ends of a previously generated ellipse. At a step 1222, and as described in connection with FIG. 7G, the area bounded by the joining lines is filled with the selected pattern or color.

At a decision step 1224, it is determined if an undo function has been selected. If not, flow diagram 1200 proceeds to a decision step 1232. On the other hand, if an undo function has been selected, at a step 1226, the last change to the image made by the user is undone. Once the last change has been undone at step 1226, in a decision step 1228, it is determined if a redo function has been selected. If so, the last change undone at step 1226 is redone at a step 1230. On the other hand, if it is determined at decision step 1228 that a redo function has not been selected, flow diagram 1200 proceeds to a decision step 1232.

At decision step 1232, it is determined if the application had been terminated by a user or otherwise has ended. If so, the flow diagram 1200 proceeds to a step 1234 where the flow diagram ends. On the other hand, if it is determined at decision step 1232 that the application has not ended, flow diagram 1200 loops to decision step 1204 to determine if a physical object has been disposed adjacent the interactive display surface. Again, it will be appreciated that the logical steps of flow diagram 1200 are conducted very rapidly. As a result, in the example of a brush being dragged across the screen, at step 1210, the connected components are determined and the resulting image produced; the remaining appropriate logical steps of flow diagram 1200 are then conducted, and flow diagram 1200 loops to step 1210 to detect a next connected component detected as the brush continues to move across the screen.

Although the present invention has been described in connection with the preferred form of practicing it and modifications thereto, those of ordinary skill in the art will understand that many other modifications can be made to the present invention within the scope of the claims that follow. For example, rotating physical objects can be used to control scrolling in vertical and horizontal directions through a document, or in a Web page displayed in a browser on the interactive table. Accordingly, it is not intended that the scope of the invention in any way be limited by the above description, but instead be determined entirely by reference to the claims that follow.

The invention in which an exclusive right is claimed is defined by the following:

1. A method for interactively producing an image on an interactive display surface by manipulating a physical object relative to the interactive display surface, comprising the steps of:
   (a) detecting a set of points presented by at least a portion of the physical object disposed adjacent to the interactive display surface during a capture interval;
   (b) generating an image corresponding to the set of points detected;
   (c) displaying the image on the interactive display surface;
   (d) detecting sets of points presented by said at least the portion of the physical object disposed adjacent to the interactive display surface during a plurality of capture intervals that occur successively over a time;
   (e) generating images for the sets of points, where one image is generated for each set of points detected during a different capture interval;
   (f) accumulating the images corresponding to the sets of points presented by said at least the portion of the physical object during the plurality of capture intervals;
   (g) generating a composite image for each set of points by determining at least one connected component corresponding to said at least the portion of the physical object, the connected component having a plurality of adjoining points meeting a predefined condition and being bounded by outermost points not having adjoining points in all considered directions; and
   (h) presenting the composite image comprising the images accumulated for the sets of points.

2. The method of claim 1, wherein the physical object is moved over the interactive display surface during the plurality of capture intervals.

3. The method of claim 1, further comprising the step of enhancing the composite image by blending each of the images at an offset to the images that were accumulated.

4. The method of claim 1, wherein the step of detecting the set of points presented by said at least the portion of the physical object during a capture interval includes the steps of:
   (a) transmitting infrared light through the interactive display surface toward a face of the interactive display surface adjacent to which the surface of physical object is disposed; and
   (b) detecting the set of points presented by said at least the portion of the physical object by sensing infrared light reflected from the face of the physical object back through the interactive display surface.

5. The method of claim 1, wherein the step of generating the image comprises the step of creating an ellipse representative of each connected component, the ellipse having a major axis and a minor axis.

6. The method of claim 5, wherein the ellipse representative of each connected component is created to have dimensions sufficiently large to encompass the outermost points of the connected component.

7. The method of claim 5, wherein the ellipse representative of each connected component has an equivalent statistical center and spatial moments, said spatial moment comprising the points included in the connected component.

8. The method of claim 5, further comprising the steps of:
   (a) generating a plurality of -ellipses over the plurality of capture frames, each connected component having a corresponding ellipse generated for it;
   (b) connecting ends of major axes and ends of minor axes of the ellipses generated for a connected component over the plurality of capture frames, with continuing lines to create outlined spaces; and
   (c) filling in the outlined spaces with at least one of a color and a pattern.

9. The method of claim 8, further comprising the step of enabling a user to select said at least one of the color and the pattern from a plurality of available fill attributes presented in a portion of the interactive display surface.

10. The method of claim 9, wherein the pattern includes a plurality of lines.

11. The method of claim 9, wherein the portion of the interactive display surface includes a plurality of regions representing a palette of available patterns and colors.

12. The method of claim 1, further comprising the step of fading the images that were accumulated, each of the images being successively faded as a function of time passing since the capture interval during which the set of points, from which the image was generated, was detected.

13. The method of claim 1, further comprising the step of altering the images generated when more than one image occupies a same location on the interactive display surface.

14. The method of claim 1, further comprising the step of enabling a user to undo creation of an image previously created.

15. The method of claim 14, further comprising the step of enabling the user to redo creation of an image previously removed during a previous undo.

16. The method of claim 1, further comprising the step of enabling a user to pause changes in an image presented on the interactive display surface.

17. A memory medium on which are stored machine executable instructions for carrying out the steps of claim 1.

18. A method for enabling a user to employ a physical object to produce an image on an interactive display surface, wherein the image corresponds to a portion of the physical object that is adjacent to an interactive display surface, comprising the steps of:
  (a) detecting a set of points corresponding to the portion of the physical object disposed adjacent to the interactive display surface during each of a plurality of capture intervals, wherein the step of determining the set of points presented by the physical object includes the steps of:
    (i) transmitting infrared light though the interactive display surface toward the portion of the physical object that is adjacent to the interactive display surface;
    (ii) sensing infrared light reflected from the portion of the physical object back through the interactive display surface, producing a signal; and
    (iii) detecting the set of points corresponding to the portion of the physical object based upon the signal;
  (b) generating an image on the interactive display surface representative of the set of points detected, for each of the plurality of capture intervals, wherein the step of generating the image comprises the step of:
    (i) determining at least one connected component corresponding to the portion of the physical object that is adjacent to the interactive display surface, the connected component having a plurality of adjoining points meeting a predefined condition, said connected component being bounded by outermost points not having adjoining points in all considered directions;
  (c) accumulating images representative of sets of points presented by the physical object during each of the plurality of capture intervals; and
  (d) displaying a composite image including the accumulated images of sets of points.

19. The method of claim 18, further comprising the steps of:
  (a) eliciting a user selection of at least one of a color and a pattern for filling the composite image displayed on the interactive display surface; and
  (b) filling the composite image with said one of the color and the pattern.

20. The method of claim 19, further comprising the step of generating each image with an ellipse representative of the at least one connected component, the ellipse having a major axis and a minor axis.

21. The method of claim 20, wherein the ellipse representative of each connected component has dimensions sufficiently large to encompass the outermost points included in the connected component.

22. The method of claim 20, wherein the ellipse representative of each connected component has an equivalent statistical center and spatial moments comprising the points included in the connected component.

23. The method of claim 20, further comprising the steps of:
  (a) generating a plurality of ellipses over the plurality of capture frames, each connected component having a corresponding ellipse generated for it;
  (b) connecting ends of major axes and ends of minor axes of the ellipses generated for a connected component over the plurality of capture frames, with continuing lines to create outlined spaces; and
  (c) filling in the outlined spaces with at least one of a color and a pattern.

24. The method of claim 19, wherein the step of eliciting the user selection comprises the step of presenting available pattern attributes in a portion of the interactive display surface.

25. The method of claim 24, further comprising the step of enabling the user to select one of the color and the pattern with one of the physical object and a second physical object that is placed adjacent to said one of the color and the pattern being selected from within the portion of the interactive display surface.

26. The method of claim 19, wherein the pattern comprises a plurality of lines.

27. The method of claim 19, wherein the portion of the display screen includes a plurality of regions representing a palette of available colors and patterns.

28. The method of claim 18, further comprising the step of enhancing the composite image by blending each of the images at an offset to the images that were accumulated.

29. The method of claim 18, further comprising the step of fading the images accumulated, each of the images being successively faded as a function of time passing since a capture interval during which the set of points from which the image was generated was detected.

30. The method of claim 18, further comprising the step of altering the images generated when more than one image occupies a same location on the interactive display surface.

31. The method of claim 18, further comprising the step of enabling a user to undo creation of an image previously created.

32. The method of claim 31, further comprising the step of enabling the user to redo creation of an image previously removed during a previous undo.

33. The method of claim 18, further comprising the step of enabling a user to pause changes in an image presented on the interactive display surface.

34. A memory medium on which are stored machine executable instructions for carrying out the steps of claim 18.

35. A system for providing input to an application that is being executed, to create an image in response to a physical object, comprising:
  (a) an interactive display surface adjacent to which a physical object is manipulated, said interactive display surface diffusing light, and having a processing side and an interactive side from which the image is viewed and adjacent to which the physical object can be placed, the processing side being opposite to the interactive side and parallel thereto;
  (b) a projector that projects graphic images onto the processing side of the interactive display surface, said graphic images being visible from the interactive side;
  (c) a light source disposed on the processing side of the display surface, the light source emitting infrared light that is transmitted through the display surface to the interactive side and reflected back through the interactive display surface by the physical object that is disposed adjacent to the interactive side of the interactive display surface;

(d) a light sensor disposed on the processing side of the interactive display surface, the light sensor sensing infrared light reflected back from the physical object through the processing side of the interactive display surface and imaging the interactive display surface to detect the physical object and its location;

(e) a processor in communication with the light sensor; and (f) a memory in communication with the processor, the memory storing data and machine instructions that cause the processor to carry out a plurality of functions, including:

(i) detecting sets of points presented by at least a portion of a physical object disposed adjacent to the interactive display surface during a plurality of capture intervals that occur successively over a time;

(ii) generating images for each of the sets of points detected during a different capture interval;

(iii) accumulating the images corresponding to the sets of points presented by said at least the portion of physical object during the plurality of capture intervals;

(iv) generating a composite image comprising the images accumulated for the sets of points (v) enhancing the composite image by blending each of the images at an offset to the images that were accumulated; and (vi) displaying the composite image on the interactive display surface.

36. The system of claim 35, wherein the machine language instructions further cause the processor to generate the image corresponding to each set of points by determining at least one connected component corresponding to said at least the portion of a physical object, the connected component having a plurality of adjoining points meeting a predefined condition and being bounded by outermost points not having adjoining points in all considered directions.

37. The system of claim 36, wherein the machine language instructions further cause the processor to create an ellipse representative of each connected component, the ellipse having a major axis and a minor axis.

38. The system of claim 37, wherein the ellipse representative of the set of points includes an ellipse having dimensions large enough to encompass an outermost point of all points included in the connected component.

39. The system of claim 37, wherein the ellipse representative of each connected component is created to have dimensions sufficiently large to encompass the outermost points of the connected component.

40. The system of claim 37, wherein the machine language instructions further cause the processor to:

(a) generate a plurality of ellipses over the plurality of capture frames, each connected component having a corresponding ellipse generated for it;

(b) connect ends of major axes and ends of minor axes of the ellipses generated for a connected component over the plurality of capture frames, with continuing lines to create outlined spaces; and (c) fill in the outlined spaces with at least one of a color and a pattern.

41. The system of claim 40, wherein the machine instructions further cause the processor to enable a user to select said at least one of the color and the pattern from a plurality of available fill attributes presented in a portion of the interactive display surface.

42. The system of claim 41, wherein the pattern includes a plurality of lines.

43. The system of claim 41, wherein the portion of the interactive display surface includes a plurality of regions representing a palette of available colors and patterns.

44. The system of claim 35, wherein the machine language instructions further cause the processor to fade the images that were accumulated, each of the images being successively faded as a function of time passing since the capture interval during which the set of points, from which the image was generated, was detected.

45. The system of claim 35, wherein the machine language instructions further cause the processor to alter the images generated when more than one image occupies a same location on the interactive display surface.

46. The system of claim 35, wherein the machine language instructions further cause the processor to enable a user to undo creation of an image previously created.

47. The system of claim 46, wherein the machine language instructions further cause the processor to enable the user to redo creation of an image previously removed during a previous undo.

48. The system of claim 35, wherein the machine language instructions further cause the processor to enable a user to pause changes in an image presented on the interactive display surface.

49. A system for enabling a user to employ a physical object produce an image, comprising:

(a) an interactive display surface adjacent to which a physical object is manipulated, said interactive display surface diffusing light, and having a processing side and an interactive side from which the image is viewed and adjacent to which the physical object can be placed, the processing side being opposite to the interactive side;

(b) a projector that projects graphic images onto the processing side of the interactive display surface, said graphic images being visible from the interactive side;

(c) a light source disposed on the processing side of the display surface, the light source emitting infrared light that is transmitted through the display surface to the interactive side and reflected back through the interactive display surface by the physical object that is disposed adjacent to the interactive side of the interactive display surface;

(d) a light sensor disposed on the processing side of the interactive display surface, the light sensor sensing infrared light reflected back from the physical object through the interactive display surface and imaging the interactive display surface to detect the physical object and its location;

(e) a processor in communication with the light sensor; and (f) a memory in communication with the processor, the memory storing data and machine instructions that cause the processor to carry out a plurality of functions, including:

(i) detecting a set of points corresponding to a portion of a physical object disposed adjacent to the interactive display surface during each of a plurality of capture intervals, wherein the set of points is detected in a signal produced by the light sensor in response to infrared from the light source that is reflected from the portion of the a physical object disposed adjacent to the interactive display surface;

(ii) generating an image on the interactive display surface representative of the set of points detected, for each of the plurality of capture intervals, wherein the machine language instructions generate the image by determining at least one connected component corresponding to the portion of a physical object that is adjacent to the interactive display surface, the connected component having a plurality of adjoining points meeting a predefined condition, said connected component being bounded by outermost points not having adjoining points in all considered directions;

(iii) accumulating images representative of sets of points presented by the physical object during each of the plurality of capture intervals; and (iv) displaying a composite image including the accumulated images of sets of points.

50. The system of claim 49, wherein the machine instructions further cause the processor to:

(a) elicit a user selection of at least one of a color and a pattern for filling the composite image displayed on the interactive display surface; and (b) fill the composite image with said one of the color and the pattern.

51. The system of claim 50, wherein the machine instructions further cause the processor to present available pattern attributes in a portion of the interactive display surface when eliciting the user selection of at least one of the color and the pattern.

52. The system of claim 51, wherein the machine language instructions further cause the processor to enable a user to select one of the color and the pattern with one of the physical object and a second physical object that is placed adjacent to said one of the color and the pattern being selected from within the portion of the interactive display surface.

53. The system of claim 50, wherein the pattern comprises a plurality of lines.

54. The system of claim 50, wherein the portion of the display screen includes a plurality of regions representing a palette of available colors and patterns.

55. The system of claim 49, wherein the machine language instructions further cause the processor to enhance the composite image by blending each of the images at an offset to the images that were accumulated.

56. The system of claim 49, wherein the machine language instructions further cause the processor to generate each image with an ellipse representative of the at least one connected component, the ellipse having a major axis and a minor axis.

57. The system of claim 56, wherein the ellipse representative of each connected component has dimensions sufficiently large to encompass the outermost points included in the connected component.

58. The system of claim 56, wherein the ellipse representative of each connected component has an equivalent statistical center and spatial moments comprising the points included in the connected component.

59. The system of claim 56, wherein the machine language instructions further cause the processor to:

(a) generating a plurality of ellipses over the plurality of capture frames, each connected component having a corresponding ellipse generated for it;

(b) connecting ends of major axes and ends of minor axes of the ellipses generated for a connected component over the plurality of capture frames, with continuing lines to create outlined spaces; and (c) filling in the outlined spaces with at least one of a color and a pattern.

60. The system of claim 49, wherein the machine language instructions further cause the processor to fade the images accumulated, each of the images being successively faded as a function of time passing since a capture interval during which the set of points from which the image was generated was detected.

61. The system of claim 49, wherein the machine language instructions further cause the processor to alter the images generated when more than one image occupies a same location on the interactive display surface.

62. The system of claim 49, wherein the machine language instructions further cause the processor to enable a user to undo creation of an image previously created.

63. The system of claim 62, wherein the machine language instructions further cause the processor to enabling the user to redo creation of an image previously removed during a previous undo.

64. The system of claim 49, wherein the machine language instructions further cause the processor to enable a user to pause changes in an image presented on the interactive display surface.

* * * * *